(12) United States Patent
Chen et al.

(10) Patent No.: US 11,341,851 B2
(45) Date of Patent: May 24, 2022

(54) SYSTEMS AND METHODS FOR DISPLAYING A MOVEMENT OF A VEHICLE ON A MAP

(71) Applicant: BEIJING DIDI INFINITY TECHNOLOGY AND DEVELOPMENT CO., LTD., Beijing (CN)

(72) Inventors: Qiao Chen, Hangzhou (CN); Yingchuan Xu, Hangzhou (CN); Kegang Wang, Beijing (CN); Pengxuan Li, Beijing (CN); Chao Liu, Beijing (CN); Chao Ye, Beijing (CN); Qian Mu, Beijing (CN); Yong Qiao, Beijing (CN); Zhenlin Yang, Tianjin (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 28 days.

(21) Appl. No.: 16/987,349

(22) Filed: Aug. 6, 2020

(65) Prior Publication Data
US 2020/0365024 A1 Nov. 19, 2020

Related U.S. Application Data

(60) Division of application No. 16/221,505, filed on Dec. 15, 2018, now Pat. No. 10,777,080, which is a
(Continued)

(30) Foreign Application Priority Data

Jun. 19, 2017 (CN) .......................... 201710466200.X
Jun. 20, 2017 (CN) .......................... 201710471851.8

(51) Int. Cl.
*G08G 1/123* (2006.01)
*G08G 1/13* (2006.01)
(Continued)

(52) U.S. Cl.
CPC ........... *G08G 1/13* (2013.01); *G01C 21/3635* (2013.01); *G01C 21/3676* (2013.01);
(Continued)

(58) Field of Classification Search
None
See application file for complete search history.

(56) References Cited

U.S. PATENT DOCUMENTS 5,406,493 A   4/1995   Goto et al.
5,862,510 A   1/1999   Saga et al.
(Continued)

FOREIGN PATENT DOCUMENTS

JP   2005017200 A   1/2005
JP   2005332004 A   12/2005
JP   4554986 B2    9/2010

OTHER PUBLICATIONS

Notice of reasons for refusal in Japanese Application No. 2018-565761 dated Feb. 9, 2021, 5 pages.

*Primary Examiner* — Brent Swarthout
(74) *Attorney, Agent, or Firm* — Metis IP LLC

(57) ABSTRACT

A method for displaying a smooth movement of a vehicle on a map may include obtaining a route, a last real-time location of the vehicle, and a last uploading time point. The method may also include obtaining driving data of one or more neighboring vehicles and determining a predicted location of the vehicle at a prediction generating time point. The method may further include displaying a smooth movement of the vehicle from the last real-time location to the predicted location on a map. A method for displaying a
(Continued)

driving path of a vehicle on a map may include obtaining a request for displaying a driving path of a vehicle, location information of the vehicle, and scene related information associated with the driving path. The method may further include verifying the location information based on the scene related information and displaying the driving path of the vehicle on a map.

17 Claims, 21 Drawing Sheets

Related U.S. Application Data continuation of application No. PCT/CN2018/091824, filed on Jun. 19, 2018.

(51) Int. Cl.
*G01C 21/36* (2006.01)
*H04W 4/029* (2018.01)
*G08G 1/00* (2006.01)

(52) U.S. Cl.
CPC ............ *G08G 1/123* (2013.01); *H04W 4/029* (2018.02); *G08G 1/205* (2013.01)

(56) References Cited

U.S. PATENT DOCUMENTS

| | | |
|---|---|---|
| 9,347,779 B1 | 5/2016 | Lynch |
| 2007/0273559 A1 | 11/2007 | Furuya et al. |
| 2012/0150436 A1 | 6/2012 | Rossano et al. |
| 2013/0155115 A1 | 6/2013 | Wang et al. |
| 2014/0100746 A1 | 4/2014 | Wilde et al. |
| 2016/0061614 A1 | 3/2016 | Lee et al. |
| 2016/0069703 A1 | 3/2016 | Nakano et al. |
| 2016/0171574 A1* | 6/2016 | Paulucci ............ G01C 21/3697 705/13 |
| 2017/0122754 A1 | 5/2017 | Konishi et al. |
| 2017/0146359 A1 | 5/2017 | Hsu |
| 2019/0130745 A1* | 5/2019 | Turato ................... G08G 1/123 |
| 2019/0186940 A1* | 6/2019 | Hwang ............... B60W 30/095 |
| 2020/0349666 A1* | 11/2020 | Hodge ................... G06F 21/36 |

* cited by examiner

1200

```
┌─────────────────────────────────────────────────────────┐
│ Obtaining a last real-time location uploaded by a vehicle and │  1202
│ a last uploading time point corresponding to the last real- │
│                    time location                         │
└─────────────────────────────────────────────────────────┘
                          │
                          ▼
┌─────────────────────────────────────────────────────────┐
│ For all the real-time locations uploaded by the vehicle, if a │  1204
│ currently uploaded real-time location is behind a last   │
│ uploaded real-time location on a route along a driving   │
│ direction of the vehicle, discarding the last uploaded real- │
│                    time location                         │
└─────────────────────────────────────────────────────────┘
                          │
                          ▼
┌─────────────────────────────────────────────────────────┐
│ Determining a predicted location for the vehicle at an end of │
│ a predetermined time period based on the predetermined   │  1206
│ time period, the last real-time location, the last uploading │
│ time point, driving data of one or more neighboring vehicles, │
│              and the route of the vehicle               │
└─────────────────────────────────────────────────────────┘
                          │
                          ▼
┌─────────────────────────────────────────────────────────┐
│ Displaying a smooth movement of the vehicle along the   │  1208
│ route on a map based on the actual location, the predicted │
│ location for the vehicle and the predetermined time period │
└─────────────────────────────────────────────────────────┘
```

FIG. 12

SYSTEMS AND METHODS FOR DISPLAYING A MOVEMENT OF A VEHICLE ON A MAP

CROSS-REFERENCE TO RELATED APPLICATIONS

This application is a divisional application of U.S. patent application Ser. No. 16/221,505, filed on Dec. 15, 2018, now U.S. Pat. No. 10,777,080, which is a continuation of International Application No. PCT/CN2018/091824, filed on Jun. 19, 2018, which claims priority to Chinese Patent Application No. 201710471851.8, filed on Jun. 20, 2017 and Chinese Patent Application No. 201710466200.X, filed on Jun. 19, 2017. The entire contents of all applications are incorporated herein by reference.

TECHNICAL FIELD

The present disclosure generally relates to communication technology, and in particular, to systems and methods for displaying a movement of a vehicle on a digital map.

BACKGROUND

Public transportation services and online car-hailing services have become major travel means for people. If people have an access to real-time information of a vehicle, such as a bus, they may not have to spend a long time waiting at a bus station. In some embodiments, the vehicle may upload real-time information, including a location of the vehicle, at a predetermined time interval. A user (e.g., a passenger) may query the location of a vehicle through a terminal device (e.g., a mobile phone). However, the real-time information of a vehicle is often limited due to various objective conditions. For example, the user may only query a real-time location uploaded by a bus 5 minute ago, but may not know the current location of the bus or a current driving status of the bus.

Additionally, for the monitoring and management of a vehicle, a driving status of the vehicle may be evaluated based on driving data of the vehicle. For example, the driving data may include images, sounds, and/or the speed of the vehicle recorded during the driving process. However, such information and an actual driving process of the vehicle are often separated. In particular, a continuous changing process of geographical locations of the vehicle is difficult to be shown, thus reducing efficiency of the monitoring and management of the vehicle. Therefore, it is desirable to provide systems and methods for displaying a movement of a vehicle more efficiently on a map.

SUMMARY

According to an aspect of the present disclosure, a method for displaying a smooth movement of a vehicle on a map is provided. The method may be implemented on a computing device having at least one processor, at least one computer-readable storage medium, and a communication platform connected to a network. The method may include obtaining a route of a vehicle via communicating with a service provider over a network. The method may also include obtaining a last real-time location of the vehicle on the route and a last uploading time point corresponding to the last real-time location. The method may also include obtaining driving data of one or more neighboring vehicles associated with the vehicle via communicating with the service provider over the network. The method may further include determining a predicted location of the vehicle on the route at a prediction generating time point based on the last real-time location, the last uploading time point, and the driving data of one or more neighboring vehicles associated with the vehicle. The method may further include displaying a smooth movement of the vehicle from the last real-time location to the predicted location on a map implemented on a terminal device.

In some embodiments, the driving data of the one or more neighboring vehicles associated with the vehicle may include velocities of the one or more neighboring vehicles.

In some embodiments, determining the predicted location of the vehicle on the route at the prediction generating time point may include determining a velocity of the vehicle based on velocities of the one or more neighboring vehicles associated with the vehicle, determining a predicted distance that the vehicle travels from the last uploading time point to the prediction generating time point based on the velocity, and determining the predicted location of the vehicle on the route at the prediction generating time point based on the predicted distance and the last real-time location.

In some embodiments, the driving data of the one or more neighboring vehicles associated with the vehicle may include durations of the one or more neighboring vehicles to traverse one or more parts of the route.

In some embodiments, determining the predicted location of the vehicle on the route at the prediction generating time point may include determining a predicted distance that the vehicle traverses from the last uploading time point to the prediction generating time point based on the durations of the one or more neighboring vehicles to traverse one or more parts of the route. Determining the predicted location of the vehicle on the route at the prediction generating time point may also include determining the predicted location of the vehicle on the route at the prediction generating time point based on the predicted distance and the last real-time location.

In some embodiments, the method may further include determining a distance between the last real-time location and a station near the route. The method may further include determining whether the distance is smaller than a threshold. In response to the determination that the distance is smaller than the threshold, the method may include displaying the vehicle in a stationary status at a predicted location between the last real-time location and the station for a first duration on the map implemented on the terminal device.

In some embodiments, the method may further include obtaining a current real-time location of the vehicle. The method may further include determining whether the predicted location at the prediction generating time point is ahead of the current real-time location of the vehicle. In response to the determination that the predicted location at the prediction generating time point is ahead of the current real-time location of the vehicle, the method may further include displaying the vehicle in a stationary status at the predicted location on the map implemented on the terminal device until the current real-time location of the vehicle arrives at the predicted location.

According to another aspect of the present disclosure, a system for displaying a smooth movement of a vehicle on a map is provided. The system may include at least one storage medium storing a set of instructions, at least one communication platform connected to a network, and at least one processor configured to communicate with the at least one storage medium or the at least one communication platform. When executing the set of instructions, the at least one processor may be directed to cause the system to obtain a route of a vehicle via communicating with a service provider over a network, and obtain a last real-time location of the vehicle on the route and a last uploading time point corresponding to the last real-time location. The at least one processor may be further directed to cause the system to obtain driving data of one or more neighboring vehicles associated with the vehicle via communicating with the service provider over the network. The at least one processor may be further directed to cause the system to determine a predicted location of the vehicle on the route at a prediction generating time point based on the last real-time location, the last uploading time point, and the driving data of one or more neighboring vehicles associated with the vehicle. The at least one processor may be further directed to cause the system to display a smooth movement of the vehicle from the last real-time location to the predicted location on a map implemented on a terminal device.

According to another aspect of the present disclosure, a non-transitory computer readable medium for displaying a smooth movement of a vehicle is provided. The non-transitory computer readable medium may include a set of instructions. When executed by at least one processor, the set of instructions may direct the at least one processor to effectuate a method. The method may include obtaining a route of a vehicle via communicating with a service provider over a network, and obtaining a last real-time location of the vehicle on the route and a last uploading time point corresponding to the last real-time location. The method may further include obtaining driving data of one or more neighboring vehicles associated with the vehicle via communicating with the service provider over the network. The method may further include determining a predicted location of the vehicle on the route at a prediction generating time point based on the last real-time location, the last uploading time point, and the driving data of one or more neighboring vehicles associated with the vehicle. The method may further include displaying a smooth movement of the vehicle from the last real-time location to the predicted location on a map implemented on a terminal device.

According to another aspect of the present disclosure, a method for displaying a driving path of a vehicle on a map is provided. The method may be implemented on a computing device having at least one processor, at least one computer-readable storage medium, and a communication platform connected to a network. The method may include obtaining a request for displaying a driving path of a vehicle from a terminal device and obtaining location information of the vehicle. The method may further include obtaining scene related information associated with the driving path of the vehicle. The method may further include verifying the location information based on the scene related information. The method may further include displaying the driving path of the vehicle based on the verified location information on a map implemented on the terminal device.

In some embodiments, the scene related information associated with the driving path of the vehicle may include at least one of video information related to scenes along the driving path of the vehicle, image information related to the scenes along the driving path of the vehicle, or audio information related to the scenes along the driving path of the vehicle.

In some embodiments, obtaining the scene related information associated with the driving path of the vehicle may include communicating with an information acquisition device in the vehicle over the network, and obtaining at least one of the video information, the image information, or the audio information recorded by the information acquisition device over the network.

In some embodiments, verifying the location information based on the scene related information may include identifying target objects on the driving path of the vehicle based on the video information, image information, or audio information, and determining whether the location information of the vehicle needs to be corrected based on the target objects on the driving path. The method may also include, in response to a determination that the location information of the vehicle associated with the driving path needs to be corrected, correcting the location information of the vehicle based on the target objects on the driving path of the vehicle.

In some embodiments, the method may further include displaying the driving path of the vehicle based on the corrected location information of the vehicle on the map implemented on the terminal device.

In some embodiments, displaying the driving path of the vehicle based on the verified location information on a map implemented on the terminal device may include obtaining an actual driving path generating speed of the vehicle, and displaying dynamically the driving path of the vehicle on the map based on the actual driving path generating speed of the vehicle.

In some embodiments, displaying the driving path of the vehicle based on the verified location information on a map implemented on the terminal device may include dividing the driving path of the vehicle into a plurality of segments and determining displaying properties for the plurality of segments. Displaying the driving path of the vehicle based on the verified location information on a map implemented on the terminal device may further include displaying the driving path of the vehicle on the map based on the displaying properties for the plurality of segments. At least two neighboring segments may have different displaying properties.

In some embodiments, the displaying properties for the plurality of segments may be determined based on at least one of traffic condition related to each of the plurality of segments, time information related to each of the plurality of segments, driver information related to each of the plurality of segments, or driving data related to each of the plurality of segments.

In some embodiments, the displaying properties for the plurality of segments include at least one of brightness of the color, hue of the color, or thickness of the driving path.

In some embodiments, the method may further include obtaining abnormal events of the vehicle in a historical period. The method may further include determining whether an abnormal event occurred on the driving path of the vehicle. The method may further include, in response to a determination that an abnormal event occurred on the driving path of the vehicle, tagging a corresponding location to the abnormal event on the driving path of the vehicle.

According to another aspect of the present disclosure, a system for displaying a driving path of a vehicle on a map is provided. The system may include at least one storage medium storing a set of instructions, at least one communication platform connected to a network, and at least one processor. The at least one processor may be configured to communicate with the at least one storage medium or the at least one communication platform. When executing the set of instructions, the at least one processor may be directed to cause the system to obtain a request for displaying a driving path of a vehicle from a terminal device and obtain location information of the vehicle associated with the driving path via communicating with a service provider over a network. The at least one processor may be further directed to cause the system to obtain scene related information associated with the driving path of the vehicle and verify the location information based on the scene related information. The at least one processor may be further directed to cause the system to display the driving path of the vehicle based on the verified location information on a map implemented on the terminal device.

According to another aspect of the present disclosure, a non-transitory computer readable medium for displaying a driving path of a vehicle on a map is provided. The non-transitory computer readable medium may include a set of instructions. When executed by at least one processor, the set of instructions may direct the at least one processor to effectuate a method. The method may include obtaining a request for displaying a driving path of a vehicle from a terminal device. The method may also include obtaining location information of the vehicle associated with the driving path via communicating with a service provider over a network and obtaining scene related information associated with the driving path of the vehicle. The method may also include verifying the location information based on the scene related information. The method may also display the driving path of the vehicle based on the verified location information on a map implemented on the terminal device.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 12 is a flowchart illustrating an exemplary process for displaying a smooth movement of a vehicle according to some embodiments of the present disclosure;

DETAILED DESCRIPTION

Figure 1:
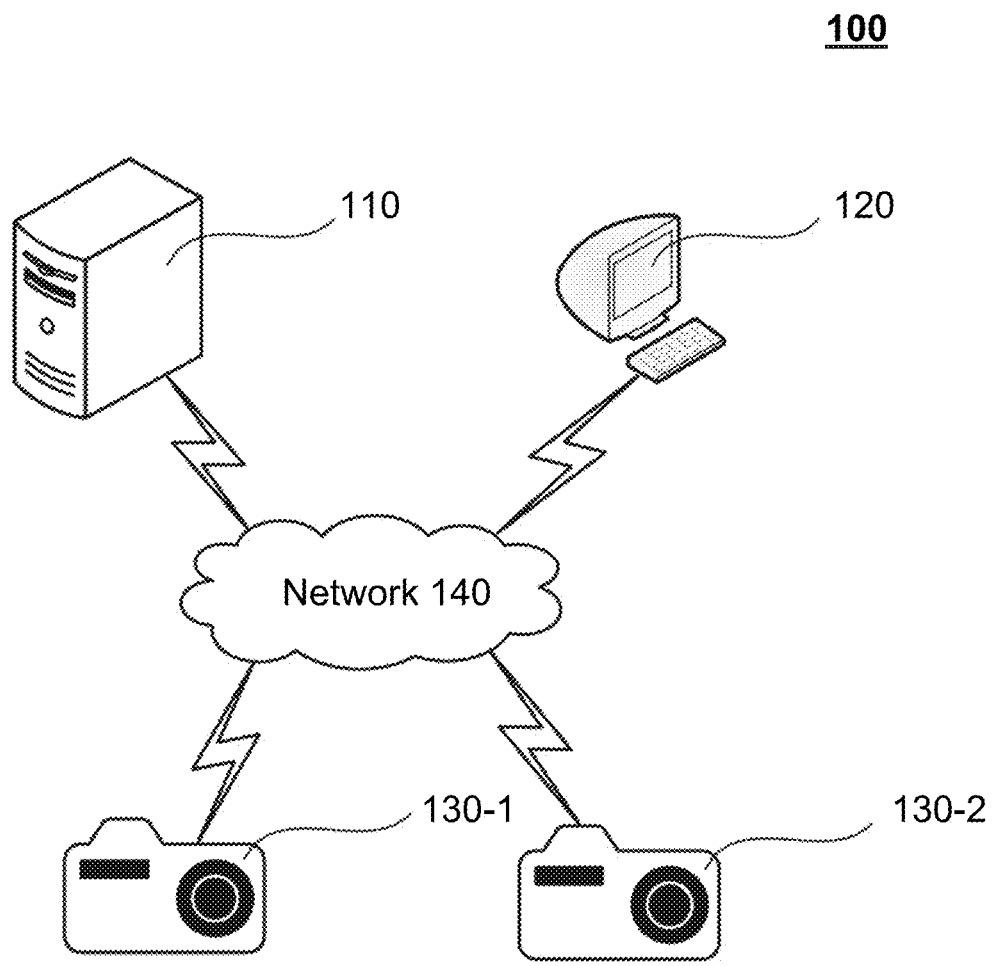
FIG. 1 is a schematic diagram illustrating an exemplary transportation information system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding assigning service requests for transportation services, it should also be understood that this is only one exemplary embodiment. The systems or methods of the present disclosure may be applied to any other kind of online to offline services. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a webpage, a plug-in of a browser, a terminal device terminal, a custom system, an internal analysis system, an artificial intelligence robot, or the like, or any combination thereof.

The terms "passenger," "requester," "requestor," "service requester," "service requestor," and "customer" in the present disclosure are used interchangeably to refer to an individual, an entity or a tool that may request or order a service. Also, the terms "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. In the present disclosure, terms "requester" and "requester terminal" may be used interchangeably, and terms "provider" and "provider terminal" may be used interchangeably.

The terms "request," "service," "service request," and "order" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

It should be noted that an online to offline service, such as online taxi-hailing including taxi hailing combination services, is a new form of service rooted only in post-Internet era. It provides technical solutions to users and service providers that could raise only in post-Internet era. In pre-Internet era, when a passenger hails a taxi on the street, the taxi request and acceptance occur only between the passenger and one taxi driver that sees the passenger. If the passenger hails a taxi through a telephone call, the service request and acceptance may occur only between the passenger and one service provider (e.g., one taxi company or agent). Online taxi, however, allows a user of the service to real-time and automatically distribute a service request to a vast number of individual service providers (e.g., taxi) distance away from the user. It also allows a plurality of service providers to respond to the service request simultaneously and in real-time. Therefore, through the Internet, the online on-demand transportation systems may provide a much more efficient transaction platform for the users and the service providers that may never meet in a traditional pre-Internet transportation service system.

In an aspect, the present disclosure is directed to systems and methods for displaying a smooth movement of a vehicle on a map implemented on a terminal device. The system may obtain a last real-time location of the vehicle on a predetermined route (e.g., a bus line, or a navigation route), and driving data of one or more neighboring vehicles associated with the vehicle, and predict a location of the vehicle on the route at a regular interval based on the last real-time location and the driving data of one or more neighboring vehicles associated with the vehicle. The predicted location of the vehicle may be transmitted to the terminal device to display a smooth movement of the vehicle.

In another aspect, the present disclosure is directed to systems and methods for displaying a driving path of a vehicle on a map implemented on a terminal device. The system may obtain location information and scene related information (e.g., video information, image information, audio information, etc.) associated with the location information. The system may verify the location information using the scene related information. For instance, the processor may identify one or more target objects on the driving path of the vehicle based on the scene related information, and determine whether the location information of the vehicle associated with the driving path needs to be corrected. The system may transmit the verified location information to the terminal device to display the driving path of the vehicle.

FIG. 1 is a schematic diagram illustrating an exemplary transportation information system according to some embodiments of the present disclosure. For example, the transportation information system 100 may be used to implement transportation services such as public transportation services, online car-hailing services, or the like. The public transportation services may include bus services, shuttle services, train services, plane services, ship services, or the like. The online car-hailing services may include taxi-hailing services, chauffeur services, express car services, carpooling services, driver hiring services, or the like, or any combination thereof. In some embodiments, the transportation information system 100 may include a server 110, a management information system (MIS) 120, one or more information acquisition devices 130 (e.g., 130-1, 130-2) and a network 140.

In some embodiments, the server 110 may be a single server, or a server group. The server group may be centralized, or distributed (e.g., the server 110 may be a distributed system). In some embodiments, the server 110 may be local or remote. For example, the server 110 may access information and/or data from the MIS 120 or the information acquisition device 130 via the network 140. As another example, the server 110 may be directly connected to the MIS 120 to access information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2.

In some embodiments, the server 110 may include a processing engine. The processing engine may process information and/or data relating to a service request to perform one or more functions described in the present disclosure. For example, the processing engine may obtain real-time locations of a vehicle and predict a location for the vehicle. The processing engine may also generate a driving path of a vehicle based on the real-time locations and the predicted locations. In some embodiments, the processing engine may include one or more processing engines (e.g., single-core processing engine(s) or multi-core processor(s)). The processing engine may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The MIS 120 may be a type of network management system. In some embodiments, the MIS 120 can be used by an administrator. The administrator may be a human being capable of performing network administrating. In some embodiments, the administrator may be an intelligent robot or a computer-implemented program that is programmed to perform network administration. In some embodiments, the MIS 120 may be implemented as an administrator terminal device. For example, the administrator terminal device may include a mobile device, a tablet computer, a laptop computer, a built-in device in a vehicle, or the like, or any combination thereof. In some embodiments, the MIS 120 may run a program of an application so as to implement associated functions of the application. For example, when the MIS 120 runs a program of displaying a driving path of a vehicle, the MIS 120 may be configured as an administrator terminal device for implementing the displaying function.

In some embodiments, the MIS 120 may obtain information from the one or more components of the transportation information system 100 (e.g., the server 110, and/or the information acquisition device 130). For example, the MIS 120 may obtain a driving path of a vehicle from the server 110 and display the driving path on a map. As another example, the MIS 120 may obtain image information, video information, audio information, etc., from the information acquisition device 130. In some embodiments, the MIS 120 may display a smooth movement of the vehicle on the map. In some embodiments, the MIS 120 may also obtain driving data of the vehicle via communicating with a service provider (not shown in FIG. 1) over the network 140. As used herein, a service provider refers to a driver, a terminal device used by a driver, a build-in device of the vehicle associated with the driver, or the like. In some embodiments, the MIS 120 may be configured to monitor and manage one or more vehicles. For example, the driving data of a vehicle may include a speed of the vehicle, a direction that the vehicle is driving to, etc. The MIS 120 may obtain abnormal events that occurred on the driving path of the vehicle based on the driving data of the vehicle, such as an abrupt break, a sharp turn, an overspeed behavior, etc. The MIS 120 may further display the abnormal events, for example, in words, or using symbols, on the driving path. In some embodiments, the MIS 120 may notify the administrator of the abnormal events. In some embodiments, the administrator may input an instruction and/or notify the information related to the vehicle to the driver of the vehicle via the MIS 120.

The one or more information acquisition devices 130 (e.g., 130-1, 130-2) may acquire information associated with a vehicle. In some embodiments, the information acquisition device 130 may run a program of an application so as to implement associated functions of the application. For example, when running a program related to a driving path of a vehicle, the information acquisition device 130 may be configured to acquire a real-time location of the vehicle and scene related information associated with the driving path of the vehicle. For instance, the scene related information may include information or objects recognized from images, videos, and/or audio segments recorded during the driving process of the vehicle. In some embodiments, the information acquisition device 130 may be a built-in device of the vehicle. In some embodiments, the information acquisition device 130 may be a terminal device associated with the driver of the vehicle. For example, the terminal device associated with the driver of the vehicle may include a mobile device, a tablet computer, a laptop computer, a built-in device in a vehicle, or the like, or any combination thereof. It should be noted that the information acquisition devices 130-1 and 130-2 shown in FIG. 1 are merely for illustration.

The network 140 may facilitate exchange of information and/or data. In some embodiments, one or more components of the transportation information system 100 (e.g., the server 110, the MIS 120 and/or the information acquisition device 130) may transmit information and/or data to other component(s) of the transportation information system 100 via the network 140. For example, the server 110 may obtain image data, video data and/or audio data from the information acquisition device 130 via the network 140. In some embodiments, the network 140 may be any type of wired or wireless network, or any combination thereof. Merely by way of example, the network 140 may include a cable network, a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 140 may include one or more network access points. For example, the network 140 may include wired or wireless network access points such as base stations and/or internet exchange points, through which one or more components of the transportation information system 100 may be connected to the network 140 to exchange data and/or information.

In some embodiments, the transportation information system 100 may further include a storage device. The storage device may store information relating and/or instructions. In some embodiments, the storage device may store data obtained from one or more components of the transportation information system 100 (e.g., the server 110, the MIS 120 and/or the information acquisition device 130). In some embodiments, the storage device may store data and/or instructions that the server 110 may execute or use to perform exemplary methods described in the present disclosure. For example, the storage device may store data and/or instructions for displaying a driving path of a vehicle. In some embodiments, the storage device may store location information related to the vehicle. In some embodiments, the storage device may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device may be connected to the network 140 to communicate with one or more components of the transportation information system 100. In some embodiments, the storage device may be directly connected to or communicate with one or more components of the transportation information system 100. In some embodiments, the storage device may be part of the server 110 and/or the MIS 120.

One of ordinary skill in the art would understand that when an element of the transportation information system 100 performs, the element may perform through electrical signals and/or electromagnetic signals. For example, when the server 110 processes a task, such as obtaining a real-time location of the vehicle from the information acquisition device 130 via the network 140, the server 110 may operate logic circuits in its processor to process such task. The server 110 may communicate with the transportation information system 100 via a wired network, the at least one information exchange port may be physically connected to a cable, which may further transmit the electrical signals to an input port (e.g., an information exchange port) of the requester terminal 130. If the server 110 communicates with the transportation information system 100 via a wireless network, the at least one information exchange port may be one or more antennas, which may convert the electrical signals to electromagnetic signals. Within an electronic device, such as the MIS 120, and/or the server 110, when a processor thereof processes an instruction, sends out an instruction, and/or performs an action, the instruction and/or action is conducted via electrical signals. For example, when the processor retrieves or saves data from a storage medium (e.g., the storage device), the processor may send out electrical signals to a read/write device of the storage medium, which may read or write structured data in the storage medium. The structured data may be transmitted to the processor in the form of electrical signals via a bus of the electronic device. Here, an electrical signal may be one electrical signal, a series of electrical signals, and/or a plurality of discrete electrical signals.

Figure 2:
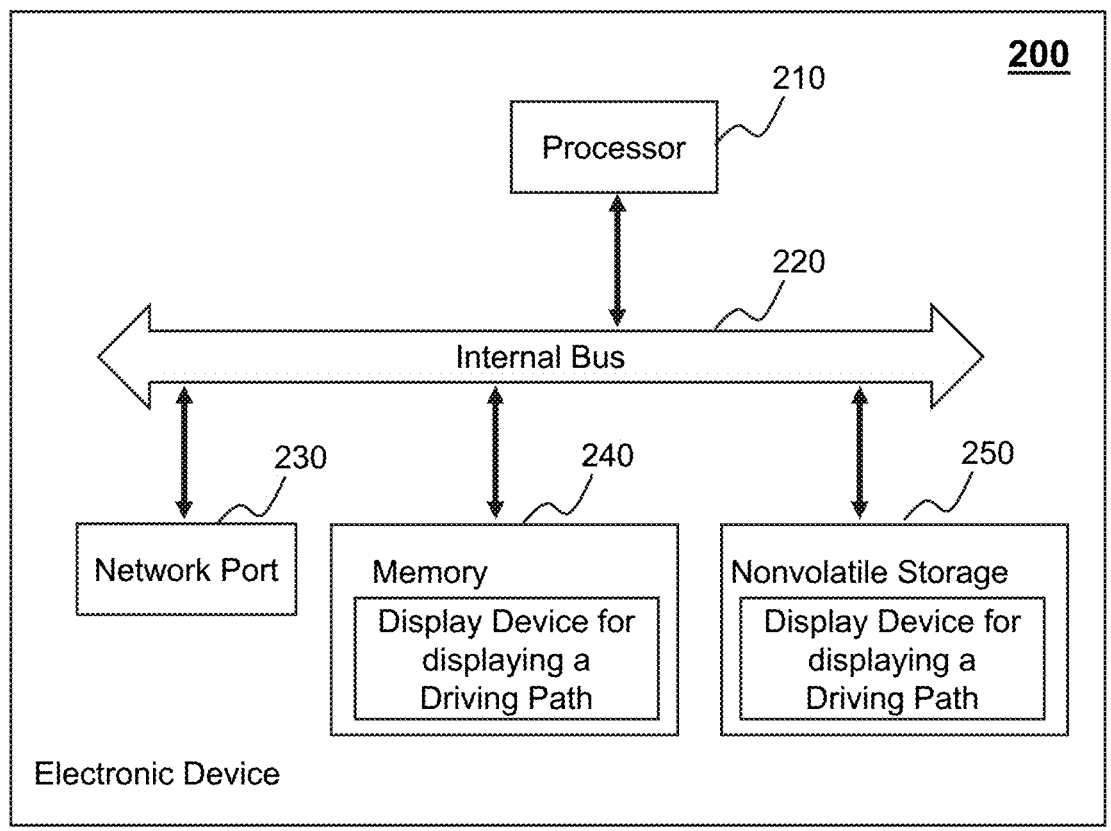
FIG. 2 is a schematic diagram illustrating exemplary hardware and/or software components of a computing device according to some embodiments of the present disclosure.

FIG. 2 is a schematic diagram illustrating exemplary hardware and/or software components of an electronic device according to some embodiments of the present disclosure. In some embodiments, the server 110, the MIS 120, and/or the information acquisition device 130 may be implemented on the electronic device 200 shown in FIG. 2. The particular system may use a functional block diagram to explain the hardware platform containing one or more user interfaces. In some embodiments, the electronic device 200 may be a computing device with general or specific functions. Both types of the computing devices may be configured to implement any particular system according to some embodiments of the present disclosure. The electronic device 200 may be configured to implement any components that perform one or more functions disclosed in the present disclosure. For example, the electronic device 200 may implement any component of the transportation information system 100 as described herein. In FIGS. 1-2, only one such electronic device is shown purely for convenience purposes. One of ordinary skill in the art would understood that the functions relating to the method of displaying a driving path of a vehicle as described herein may be implemented in a distributed fashion on a number of similar platforms, to distribute the processing load.

As shown in FIG. 2, the electronic device 200 shown in FIG. 2 may include a processor 210, an internal bus 220, a network port 230, a memory 240, and a nonvolatile storage 250. In some embodiments, other suitable hardware needed for other functions may also be included in the electronic device 200. The processor 210 may read computer program from the nonvolatile storage 250, and run the program in the memory 240 so as to implement the functions of a display device for displaying a driving path of a vehicle. Of course, apart from software implementation, the present application does not exclude other implementations, such as logic devices or a combination of hardware and software. In other words, an execution subject of the processes below may not be limited to logic units, but may also be hardware or a logic device according to some embodiments of the present disclosure.

The processor 220 may exist in the form of one or more processors (e.g., logic circuits) for executing program instructions. For example, the processor 210 may include interface circuits and processing circuits therein. The interface circuits may be configured to receive electronic signals from an internal bus 220, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the internal bus 220.

The nonvolatile storage 250 may include a read only memory (ROM) and/or a random access memory (RAM), for various data files to be processed and/or transmitted by the electronic device 200. The electronic device 200 may also include program instructions stored in the ROM, the RAM, and/or other type of non-transitory storage medium to be executed by the processor 210. The methods and/or processes of the present disclosure may be implemented as the program instructions. In some embodiments, the electronic device 200 may also include an I/O component, supporting input/output between the electronic device 200 and other components/a user. The electronic device 200 may also receive programming and data via network communications.

Merely for illustration, only one processor is illustrated in FIG. 2. Multiple processors 210 are also contemplated, and thus operations and/or method steps performed by one processor 210 as described in the present disclosure may also be jointly or separately performed by the multiple processors. For example, if in the present disclosure, the processor 210 of the electronic device 200 executes both step A and step B, it should be understood that step A and step B may also be performed by two different processors 220 jointly or separately in the electronic device 200 (e.g., a first processor executes step A and a second processor executes step B, or the first and second processors jointly execute steps A and B).

Figure 3:
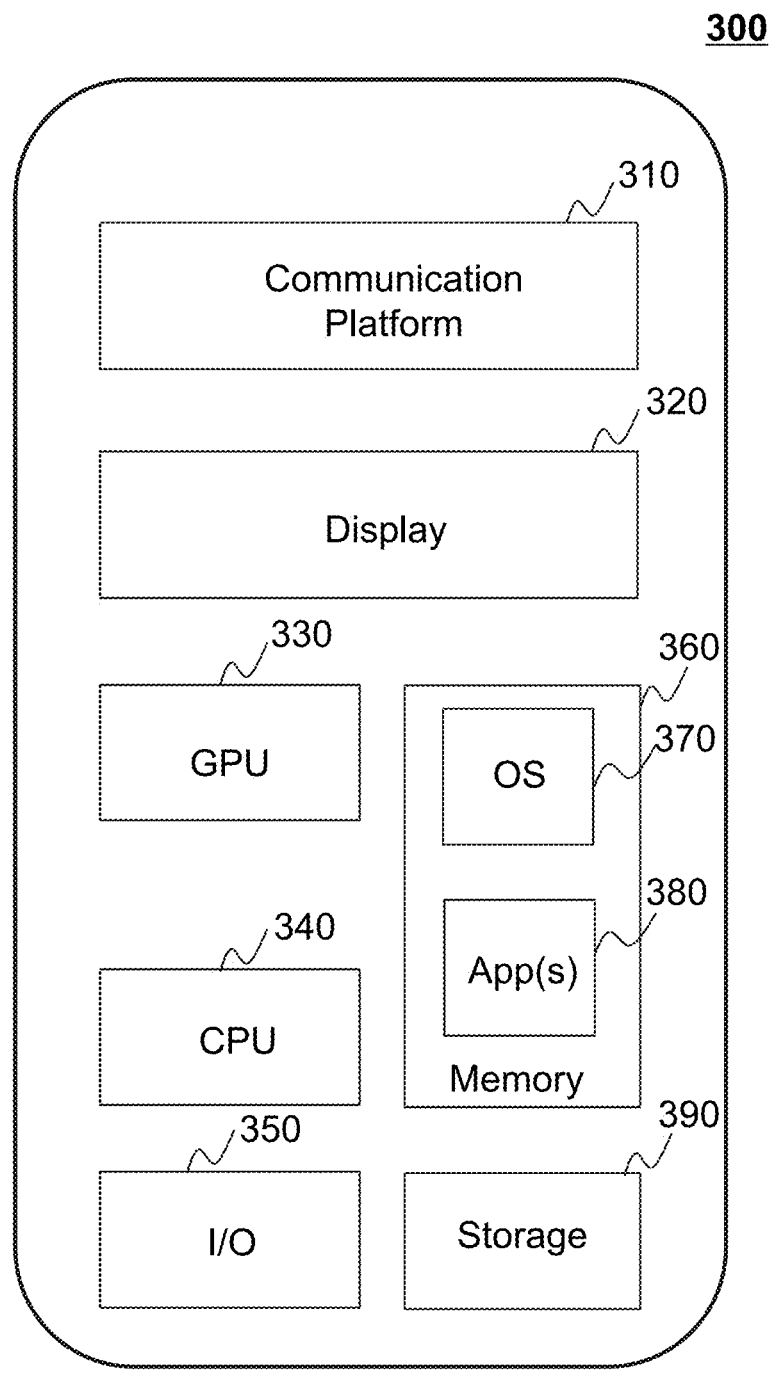
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device according to some embodiments of the present disclosure. In some embodiments, the MIS 120, the information acquisition device 130, and/or a terminal device associated with a user may be implemented on the mobile device 300 shown in FIG. 3. For instance, the user may include a service requester (e.g., a passenger), or a service provider (e.g., a driver). As illustrated in FIG. 3, the mobile device 300 may include a communication platform 310, a display 320, a graphic processing unit (GPU) 330, a central processing unit (CPU) 340, an I/O 350, a memory 360, a mobile operating system (OS) 370, and a storage 390. In some embodiments, any other suitable component, including but not limited to a system bus or a controller (not shown), may also be included in the mobile device 300.

In some embodiments, the mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to a vehicle or other information from the transportation information system 100. User interactions with the information stream may be achieved via the I/O 350 and provided to the processing engine 112 and/or other components of the transportation information system 100 via the network 140.

Figure 4A:
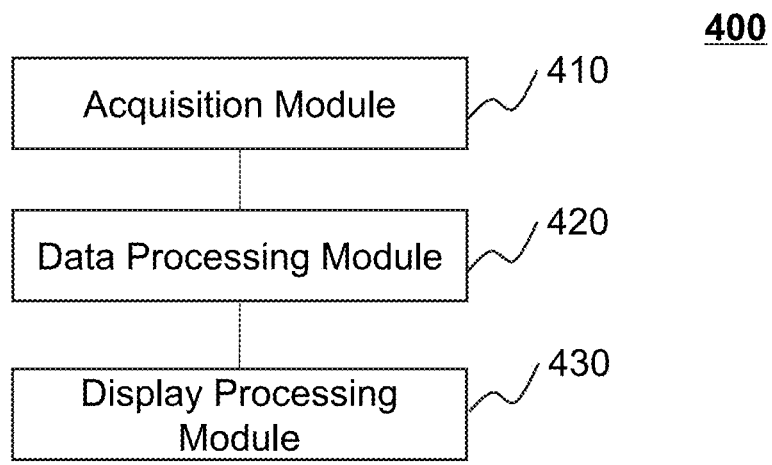
FIGS. 4A-4C are block diagrams illustrating exemplary data processing devices according to some embodiments of the present disclosure.

FIG. 4A is a block diagram illustrating an exemplary data processing device according to some embodiments of the present disclosure. The data processing device 400 shown in FIG. 4A may include an acquisition module 410, a data processing module 420, and a display processing module 430. In some embodiments, the data processing module 400 shown in FIG. 4A may be an independent device or integrated into the server 110, the MIS 120, the mobile device 300, etc. For example, the data processing device 400 may be part of the processor 210.

The acquisition module 410 may obtain information from one more components of the transportation information system 100. In some embodiments, the acquisition module 410 may obtain a route of a vehicle via communicating with a service provider over a network (e.g., the network 140). In some embodiments, the acquisition module 410 may obtain a last real-time location uploaded by a vehicle and a last uploading time point corresponding to the last real-time location. In some embodiments, the acquisition module 410 may obtain driving data of one or more neighboring vehicles associated with the vehicle via communicating with the service provider over the network. For example, the driving data of the one or more neighboring vehicles may include velocities, moving directions, and/or turning angles of the one or more neighboring vehicles currently within the predetermined distance from the vehicle. As another example, the driving data of the one or more neighboring vehicles may include the durations of the one or more neighboring vehicles to traverse one or more parts of the route.

The data processing module 420 may process data related to the vehicle. In some embodiments, the data processing module 420 may determine a predicted location of the vehicle on the route at a prediction generating time point based on the last real-time location, the last uploading time point, and the driving data of one or more neighboring vehicles associated with the vehicle. In some embodiments, the data processing module 420 may determine a predicted location for each predetermined time period. The predetermined time period may be, for example, 3 seconds, 5 seconds, 10 seconds, etc.

The display processing module 430 may process data related to the smooth movement of the vehicle. In some embodiments, the display processing module 430 may include a searching unit and a dynamic display unit. The searching unit may match the real-time locations and the predicted locations with the route of the vehicle. For example, the searching unit may determine track points which are closest to the real-time locations and the predicted locations for the vehicle from all the track points on the route. The dynamic display unit may display all the determined track points on a map in a time sequence.

The modules/units in FIG. 4A may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. Two or more of the modules may be combined into a single module, and any one of the modules may be divided into two or more units.

Figure 4B:
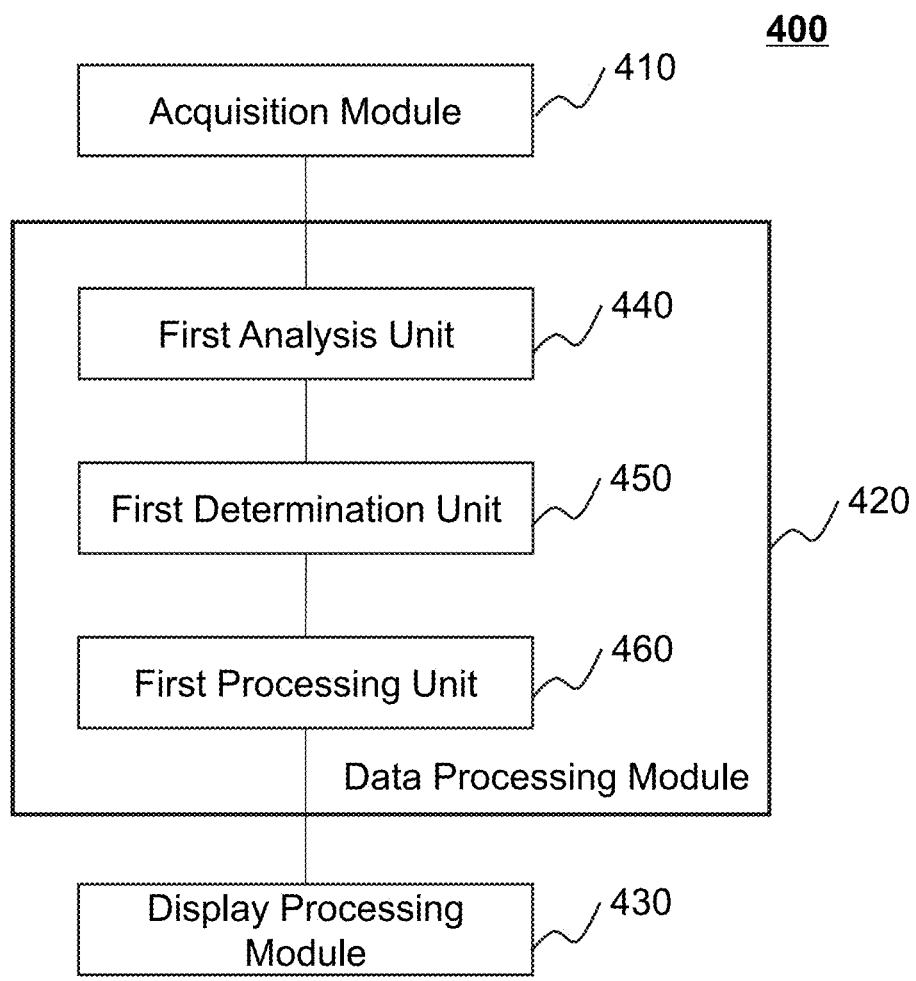

FIG. 4B is a block diagram illustrating an exemplary data processing device according to some embodiments of the present disclosure. The data processing device 400 shown in FIG. 4B may include an acquisition module 410, a data processing module 420, and a display processing module 430. In some embodiments, the data processing device 400 shown in FIG. 4B may be an independent device or integrated into the server 110, the MIS 120, the mobile device 300, etc. For example, the data processing device 400 may be part of the processor 210. In connection with the description in FIG. 4A, the data processing module 420 may further include a first analysis unit 440, a first determination unit 450, and a first processing unit 460.

The first analysis unit 440 may determine a velocity of the vehicle. In some embodiments, the first analysis unit 440 may determine the velocity of the vehicle based on velocities of one or more neighboring vehicles that are currently within a predetermined distance from the vehicle. In some embodiments, the first analysis unit 440 may determine the duration of the vehicle to traverse one or more parts of the route based on durations of one or more neighboring vehicles to traverse one or more parts of the route. In some embodiments, the first analysis unit 440 may determine the velocity of the vehicle based on the durations of the one or more neighboring vehicles to traverse one or more parts of the route. Merely by ways of example, the neighboring vehicles may have traversed the one or more parts of the route a day ago, a week ago, a month ago, etc.

The first determination unit 450 may determine a predicted distance for the vehicle. In some embodiments, the first determination unit 450 may determine the predicted distance for the vehicle within a time interval between the last uploading time point and the prediction generating time point based on the velocity of the vehicle or the duration of the vehicle to traverse one or more parts of the route of the vehicle. The last uploading time point may be a time point when the vehicle uploads the last real-time location. The prediction generating time point may be an end of a predetermined time period. In some embodiments, the end of a current predetermined time period may be the start of a next predetermined time period.

The first processing unit 460 may determine a predicted location for the vehicle at the prediction generating time point. In some embodiments, the first processing unit 460 may determine the predicted location for the vehicle at the prediction generating time point based on a predetermined time period, the last real-time location, the last uploading time point, driving data of one or more neighboring vehicles, and a route of the vehicle.

The modules/units in FIG. 4B may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. Two or more of the modules may be combined into a single module, and any one of the modules may be divided into two or more units.

Figure 4C:
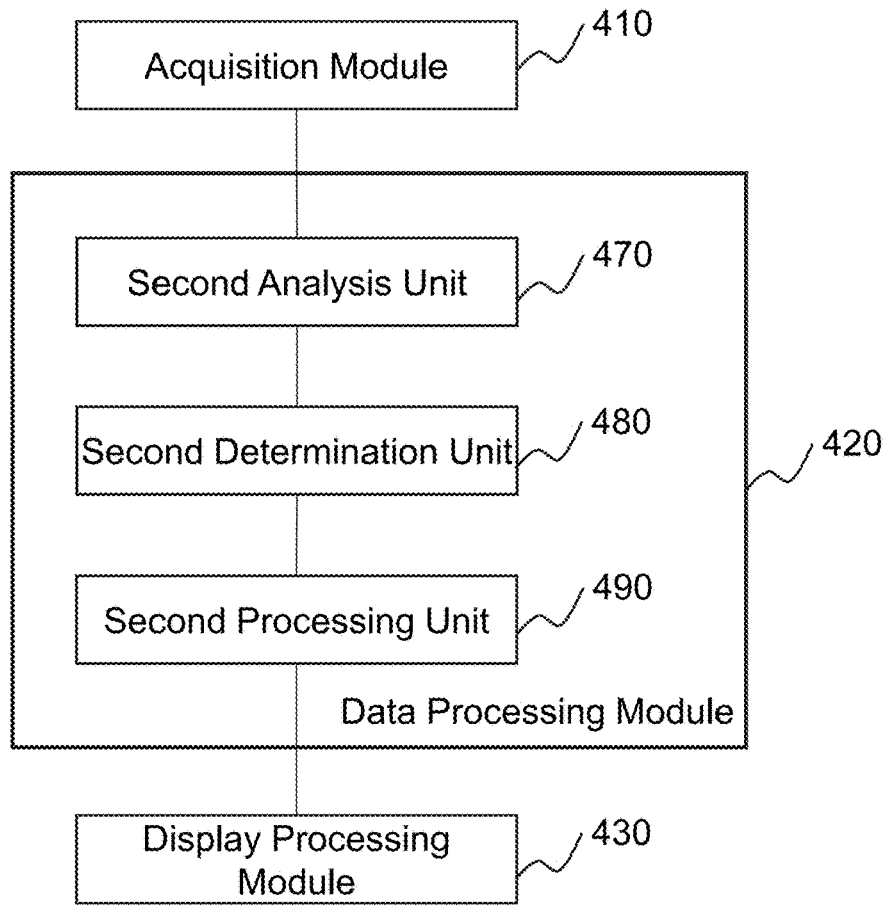

FIG. 4C is a block diagram illustrating an exemplary data processing device according to some embodiments of the present disclosure. The data processing device 400 shown in FIG. 4C may include an acquisition module 410, a data processing module 420, and a display processing module 430. In some embodiments, the data processing device 400 shown in FIG. 4C may be an independent device or integrated into the server 110, the MIS 120, the mobile device 300, etc. For example, the data processing device 400 may be part of the processor 210. In connection with the description in FIG. 4A, the data processing module 420 may further include a first analysis unit 440, a first determination unit 450, and a first processing unit 460.

The second analysis unit 470 may determine a velocity of the vehicle. Details regarding the second analysis unit 470 may be found elsewhere (e.g., in connection with the description of the first analysis unit 440 in FIG. 4B).

The second determination unit 480 may determine a predicted distance of the vehicle. In some embodiments, the second determination unit 480 may determine the predicted distance of the vehicle within the predetermined time period based on the velocity of the vehicle and a time length of the predetermined time period. In some embodiments, the processor 210 may determine the predicted distance of the vehicle based on a motion of the vehicle at a constant velocity. Thus the predicted distance may be equal to a product of the velocity of the vehicle and a time length of the predetermined time period.

The second processing unit 490 may determine a predicted location of the vehicle. In some embodiments, the second processing unit 490 may determine the predicted location for the vehicle at an end of each predetermined time period based on a last predicted location in a last predetermined time period, the predicted distance of the vehicle within the each predetermined time period, and a route of the vehicle.

The modules/units in FIG. 4C may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. Two or more of the modules may be combined into a single module, and any one of the modules may be divided into two or more units.

Figure 5:
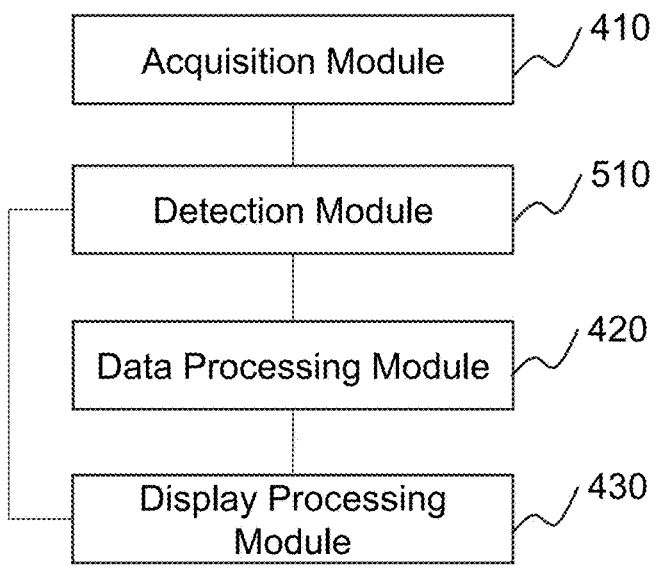
FIG. 5 is a block diagram illustrating an exemplary data processing device according to some embodiments of the present disclosure.

FIG. 5 is a block diagram illustrating an exemplary data processing device according to some embodiments of the present disclosure. The data processing device 500 shown in FIG. 5 may include an acquisition module 410, a data processing module 420, and a display processing module 430, and a detection module 510. In some embodiments, the data processing device 500 shown in FIG. 5 may be an independent device or integrated into the server 110, the MIS 120, the mobile device 300, etc. For example, the data processing device 500 may be part of the processor 210. Details regarding the acquisition module 410, the data processing module 420, and the display processing module 430 may be found elsewhere (e.g., in connection with FIGS. 4A-4C).

The detection module 510 may determine whether the vehicle is stationary. In some embodiments, the vehicle may stop near a station or due to congestion/a red traffic light. For example, the detection module 510 may determine that the vehicle stops near a station if a distance between the last real-time location and a station near the route is less than a threshold. As another example, if the velocities of the one or more neighboring vehicles currently within a predetermined distance from the vehicle are zero, the detection module 510 may determine that the vehicle is currently stationary due to congestion/a red traffic light.

If the vehicle is in a stationary status, the data processing module 420 may not need to determine a predicted location for the vehicle. If the vehicle is near a station, the displaying processing module 430 may add the last real-time location to the route and display the vehicle in a stationary status at an estimated location between the last real-time location and the station or the last real-time location on the route for a first duration on the map implemented on the terminal device. If the vehicle stops due to congestion/a red traffic light, the displaying processing module 430 may add the last real-time location to the route and display the vehicle in a stationary status at the last predicted location or the last real-time location on the route for a first duration on the map implemented on the terminal device.

The modules/units in FIG. 5 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. Two or more of the modules may be combined into a single module, and any one of the modules may be divided into two or more units.

Figure 6A:
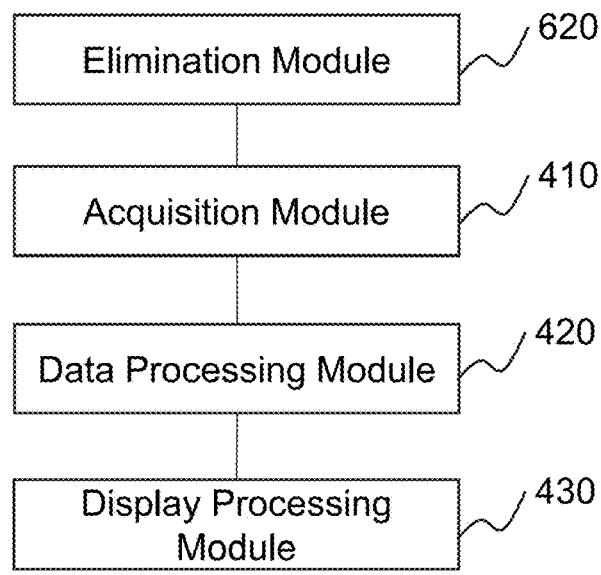
FIGS. 6A and 6B are block diagrams illustrating exemplary data processing devices according to some embodiments of the present disclosure.

FIG. 6A is a block diagram illustrating an exemplary data processing device according to some embodiments of the present disclosure. The data processing device 600 shown in FIG. 6A may include an elimination module 620, an acquisition module 410, a data processing module 420, and a display processing module 430. In some embodiments, the data processing device 600 shown in FIG. 6A may be an independent device or integrated into the server 110, the MIS 120, the mobile device 300, etc. For example, the data processing device 600 may be part of the processor 210. Details regarding the acquisition module 410, the data processing module 420, and the display processing module 430 may be found elsewhere (e.g., in connection with FIGS. 4A-4C).

The elimination module 620 may discard an inaccurate real-time location or an inaccurate predicted location of the vehicle. In some embodiments, if a current real-time location of the vehicle is behind a last real-time location on the route along a driving direction of the vehicle, the elimination module 620 may discard the current real-time location. In some embodiments, if a currently predicted location is behind a last predicted location on a route along a driving direction of the vehicle, the elimination module 620 may discard the currently predicted location. In some embodiments, a vehicle on a given route may travel one-way along the given route, and thus the elimination module 620 may correct inaccurate real-time locations or inaccurate predicted locations based on the route.

Figure 6B:
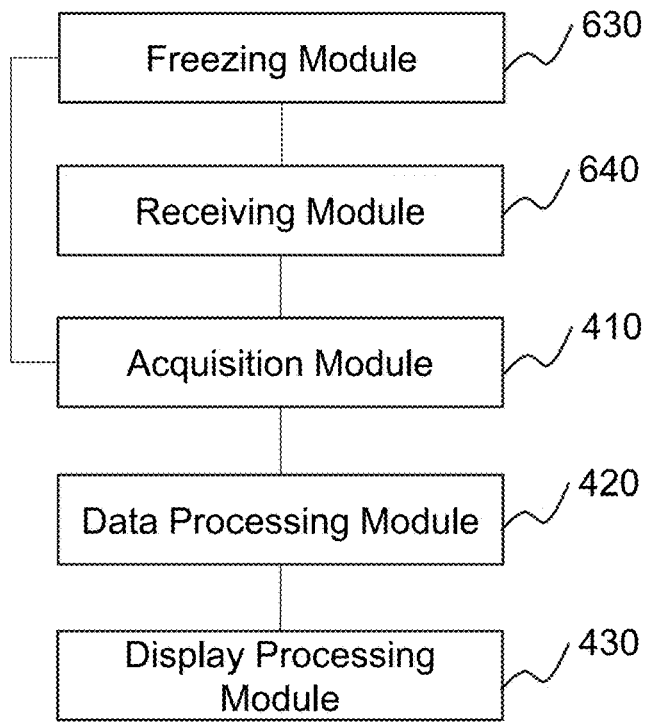

FIG. 6B is a block diagram illustrating an exemplary data processing device according to some embodiments of the present disclosure. The data processing device 650 shown in FIG. 6B may include a freezing module 630, a receiving module 640, an acquisition module 410, a data processing module 420, and a display processing module 430. In some embodiments, the data processing device 650 shown in FIG. 6B may be an independent device or integrated into the server 110, the MIS 120, the mobile device 300, etc. For example, the data processing device 650 may be part of the processor 210. Details regarding the acquisition module 410, the data processing module 420, and the display processing module 430 may be found elsewhere (e.g., in connection with FIGS. 4A-4C).

The receiving module 640 may receive data related to the vehicle. For example, the receiving module 640 may receive a current real-time location of the vehicle.

The freezing module 630 may freeze a currently displayed location of the vehicle. In some embodiments, if a currently displayed location is ahead of the current real-time location, the freezing module 630 may freeze the currently displayed location of the vehicle. The currently displayed location may refer to a location of the vehicle that is currently displayed on a map implemented on the terminal device. In some embodiments, the currently displayed location may be a predicted location.

If the currently displayed location is frozen, the display processing module 430 may display the vehicle in a stationary status until the current real-time location of the vehicle arrives at the predicted location.

The modules/units in FIGS. 6A and 6B may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. Two or more of the modules may be combined into a single module, and any one of the modules may be divided into two or more units.

Figure 7:
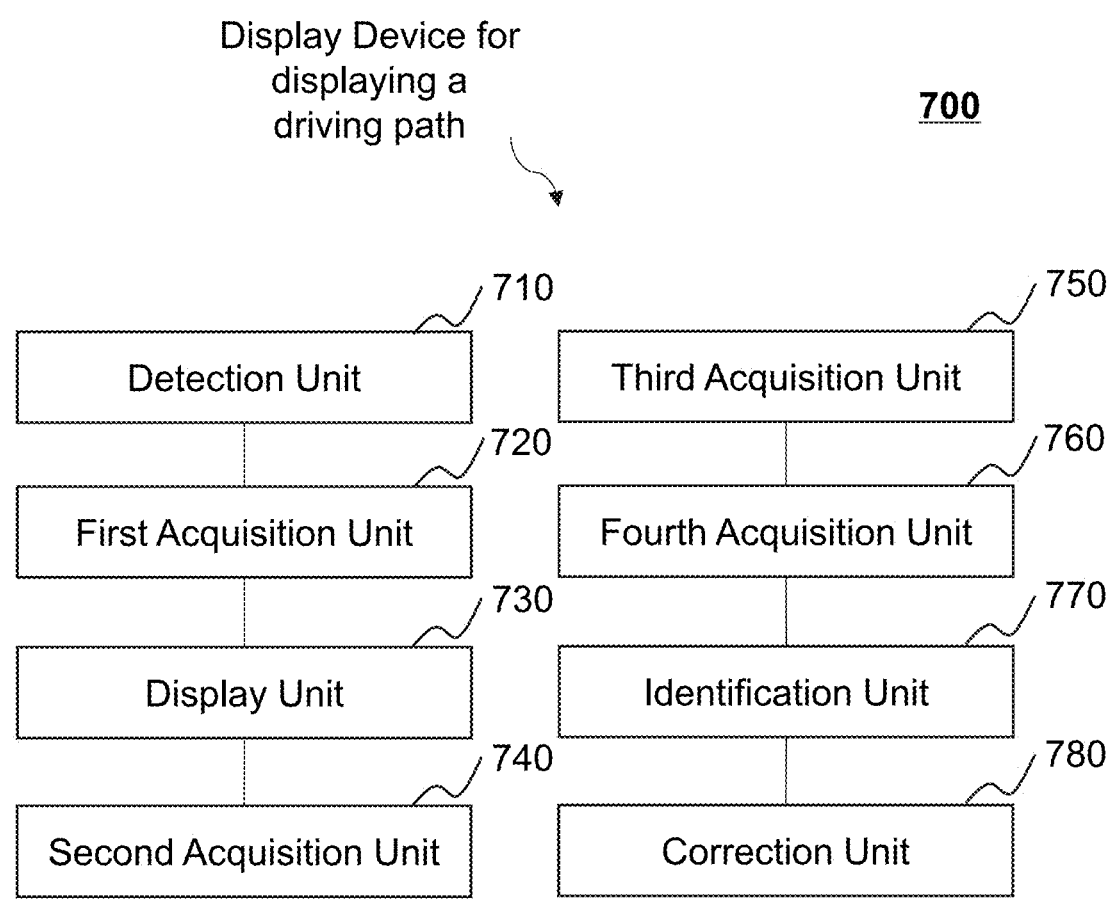
FIG. 7 is a block diagram illustrating an exemplary display device for displaying a vehicle driving path according to some embodiments of the present disclosure.

FIG. 7 is a block diagram illustrating an exemplary display device for displaying a driving path of a vehicle according to some embodiments of the present disclosure. In some embodiments, the display device 700 for displaying a driving path of the vehicle may include a detection unit 710, a first acquisition unit 720, a display unit 730, a second acquisition unit 740, a third acquisition unit 750, a fourth acquisition unit 760, an identification unit 770, and a correction unit 780. In some embodiments, the display device 700 for displaying a driving path shown in FIG. 7 may be an independent device or integrated into the server 110, the MIS 120, the mobile device 300, etc. For example, the display device 700 for displaying a driving path may be part of the processor 210.

The detection unit 710 may obtain a query operation. In some embodiments, the query operation may be a request for displaying a driving path of a vehicle within a historical time period or in real-time.

The first acquisition unit 720 may acquire location information of a vehicle within the historical time period or in real-time.

The display unit 730 may display the driving path of the vehicle on a map. In some embodiments, the display unit 730 may the driving path of the vehicle on a map based on the obtained location information. For example, the display unit 730 may display a generating process of the driving path according to an actual driving path generating speed of the vehicle or a displaying ratio with respect to the actual driving path generating speed. In some embodiments, the display unit 730 may divide the driving path into a plurality of segments based on traffic conditions, time information, driver information, driving data, or the like, or any combination thereof. The segments may be displayed with different displaying properties, such as brightness of the color, hue of the color, and/or thickness of the driving path. In some embodiments, the display unit 730 may display an image or play a video/audio when the driving path of the vehicle is displayed on the map.

The second acquisition unit 740 may obtain abnormal events of the vehicle. In some embodiments, the processor 210 may determine whether abnormal events occurred in the process for driving the vehicle based on speed information acquired by the information acquisition device 130. For example, the abnormal events may include an abrupt brake, a sudden acceleration, a sharp turn, and an overspeed behavior, or the like, or any combination thereof. In some embodiments, the second acquisition unit 740 may add certain labels to locations on the driving path where the abnormal events occur so as to mark the abnormal events.

The third acquisition unit 750 may obtain scene related information associated with the driving path of the vehicle. In some embodiments, the scene related information may include image information, video information, and/or audio information related to scenes along the driving path of the vehicle.

The fourth acquisition unit 760 may obtain the scene related information within a historical time period or in real-time. For example, the fourth acquisition unit 760 may obtain image information, video information, and/or audio information within a historical time period or video information/audio information starting from a time point.

The identification unit 770 may identify a target object. In some embodiments, the identification unit 770 may identify a target object based on the scene related information related to scenes along the driving path of the vehicle. The target object may include a building, a square, etc.

The correction unit 780 may verify the location information based on the scene related information. In some embodiments, the correction unit 780 may determining whether the location information of the vehicle needs to be corrected based on the target objects on the driving path. Merely by ways of example, if a location indicated by the location information of the vehicle corresponding to a time point is different from a location of the target object identified from the scene related information acquired at the same time, the correction unit 780 may determine that the location information of the vehicle corresponding to the time point need to be corrected. The correction unit 780 may correct the inaccurate location information of the vehicle based on the location of the target object.

The modules/units in FIG. 7 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. Two or more of the modules may be combined into a single module, and any one of the modules may be divided into two or more units.

Figure 8:
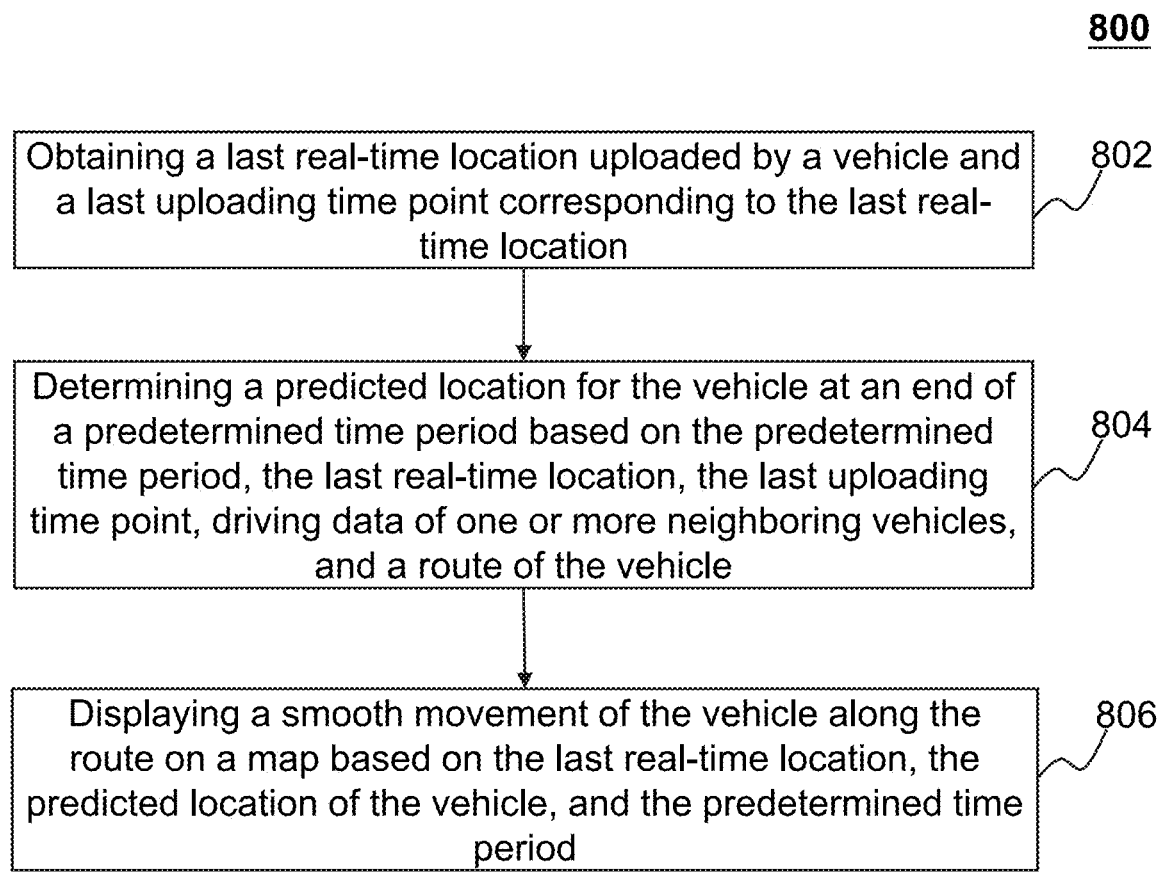
FIG. 8 is a flowchart illustrating an exemplary process for displaying a smooth movement of a vehicle according to some embodiments of the present disclosure.

FIG. 8 is a flowchart illustrating an exemplary process for displaying a smooth movement of a vehicle according to some embodiments of the present disclosure. In some embodiments, the process 800 shown in FIG. 8 may be implemented in the transportation information system 100 illustrated in FIG. 1. For example, at least a part of the process 800 may be stored in a storage medium (e.g., the nonvolatile storage 250 of the electronic device 200) as a form of instructions, and invoked and/or executed by the server 110 (e.g., the processor 210 of the electronic device 200, or one or more modules illustrated in FIGS. 4-6). In some embodiments, a part of the process 800 may be implemented on a terminal device. The operations of the illustrated process 800 presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting. As shown in FIG. 8, the process 800 may include the following operations.

In 802, the processor 210 may obtain a last real-time location uploaded by a vehicle and a last uploading time point corresponding to the last real-time location.

In some embodiments, a real-time location may include geographical location coordinates. In some embodiments, the vehicle may upload real-time locations to the server 110 at a predetermined time interval. For example, the vehicle may upload real-time locations every 30 seconds, 45 seconds, 60 seconds, etc. The last real-time location may be a location most recently uploaded by the vehicle.

A vehicle may be equipped with a positioning system. In some embodiments, a terminal device (e.g., the mobile device 300) of a driver of the vehicle may also have a positioning system. A current location of the vehicle can be obtained in real-time through the positioning system of the vehicle or the terminal device of the driver. Thus, the processor 210 may obtain a real-time location of the vehicle when the vehicle is in an area under the coverage of a network, such as a general packet radio service (GPRS) network or a code division multiple access (CDMA) network. In some embodiments, a device implementing the positioning technology can use a global positioning system (GPS), a global navigation satellite system (GLONASS), a compass navigation system (COMPASS), a BeiDou navigation satellite system, a Galileo positioning system, a quasi-zenith satellite system (QZSS), etc. In some embodiments, the positioning system may determine a position of the vehicle with a high accuracy based on a differential positioning algorithm. Merely for illustration purposes, the vehicle may be a bus.

In 804, the processor 210 may determine a predicted location for the vehicle at an end of a predetermined time period based on the predetermined time period, the last real-time location, the last uploading time point, driving data of one or more neighboring vehicles, and a route of the vehicle.

As used herein, the neighboring vehicles refer to other vehicles currently within a predetermined distance from the vehicle or other vehicles that previously traversed one or more parts of the route. For example, the predetermined distance may be 5 meters, 10 meters, 15 meters, etc. In some embodiments, the neighboring vehicles may have traversed the one or more parts of the route a day ago, a week ago, a month ago, etc. In some embodiments, the driving data of the one or more neighboring vehicles may include velocities, moving directions, and/or turning angles of the one or more neighboring vehicles currently within the predetermined distance from the vehicle. In some embodiments, the driving data of the one or more neighboring vehicles may include the durations of the one or more neighboring vehicles to traverse one or more parts of the route.

In some embodiments, the processor 210 may obtain data associated with all routes of different buses on a map in advance, such as coordinates of track points and/or station information of each route, or the like. A storage device (e.g., the nonvolatile storage device 250) may store such data as static data. Merely as an example, the route here may be a bus line.

In 806, a terminal device (e.g., a mobile device of a user, a display screen at a bus station) may display a smooth movement of the vehicle along the route on a map based on the last real-time location, the predicted location of the vehicle and the predetermined time period.

In some embodiments, a smooth movement of the vehicle may be generated by an independent client side device, a backend server, or the like. It should be noted that an order that the above operations are performed may vary. In some embodiments, the processor 210 may determine a predicted location of the vehicle at a prediction generating time point after the processor 210 obtains the last real-time location uploaded by the vehicle. In some embodiments, a predetermined time period may start from the last uploading time point, and end at the prediction generating time point. In some embodiments, the end of a last predetermined time period may be the start of a current predetermined time period. For example, the processor 210 may determine a predicted location for the vehicle at the end of a predetermined time period (e.g., 3 seconds). After the processor 210 obtains a next real-time location uploaded by the vehicle, the processor 210 may match one or more predicted locations and the next real-time location with the route of the vehicle, and display the one or more predicted locations and the next real-time location on the route, so as to display a smooth movement of the vehicle. Alternatively, as soon as the processor 210 determines each predicted location, the processor 210 may match the predicted location with the route of the vehicle, and display the each predicted location on the route. For instance, the terminal device may display a smooth movement of the vehicle from the last real-time location to the predicted location on a map implemented on the terminal device. The order that the above operations are performed is not limited in the present disclosure.

In some embodiments, in order to display a smooth movement of the vehicle in rea-time based on the real-time locations uploaded by the vehicle, the device installed on the vehicle may need to support high speed data acquisition, data processing, and data uploading. A time period for the vehicle to upload the location information may be set to be short, e.g., 3 to 5 seconds. A terminal device may display a smooth movement of the vehicle based on real-time locations of the vehicle uploaded in the time period and a route of the vehicle preset by, for example, the positioning system or the terminal device. However, 3 to 5 seconds may be too short, and the device installed on the vehicle may not support accurate positioning and uploading locations of the vehicle in such a short time period. For example, a vehicle may determine and upload a real-time location in 30 seconds. In this case, the smooth movement of the vehicle based on the real-time locations uploaded by the vehicle may not be achieved. If the terminal device displays the real-time locations uploaded by the vehicle on a route, there may be a lot of pauses during the movement of the vehicle. As a result, the movement of the vehicle on the map may demonstrate a sudden shift from one location to another location. Thus, a user (e.g., a passenger) may not know whether the vehicle arrives at a certain station in such a short time.

Thus, the processor 210 may determine a predicted location at the end of a predetermined time period (e.g., 3 seconds, 5 seconds) before the vehicle uploads a next real-time location based on a last real-time location uploaded by the vehicle at a last uploading time point. The terminal device may display a smooth movement of the vehicle along the route on a map based on the predicted locations and the last real-time location of the vehicle. In some embodiments, when the frequency at which the real-time locations are uploaded by the vehicle does not meet a preset frequency, operations in 802 through 806 may be triggered.

In some embodiments, the terminal device for displaying the smooth movement of the vehicle may be associated with a driver of the vehicle, a passenger on the vehicle, a passenger waiting for the vehicle, an administrator, etc. In some embodiments, the terminal device associated with an administrator may be the MIS 120. In some embodiments, the processor 210 and/or the terminal device may obtain a route of the vehicle by communicating with a service provider over a network (e.g., the network 140). The route of the vehicle may include a predetermined route, such as a bus line, a navigation route, or the like. The route may also be a navigation route.

In some embodiments, when the vehicle uploads a real-time location, the vehicle may also upload identification information related to the route of the vehicle. The identification information may be used to identify the route of the vehicle, for example, Bus Line 102, Bus Line 84, or the like. Taking a bus on Bus Line 84 as an example, there may be multiple ways for the bus to upload the identification information. For example, the bus may upload the vehicle identification information (e.g., a vehicle license number Jing P TT069) and the bus line (Bus Line 84) together. As another example, the bus may only upload the vehicle identification information (e.g., Jing P TT069). An electronic device, such as the server 110 and the electronic device 200, may determine a route of the bus based on a schedule of other buses running on the same bus line. For example, if the schedule shows that the bus "Jing P TT069" is on Bus Line 102, the terminal device may display a real-time smooth movement of the vehicle based on a route corresponding to the Bus Line 102.

In some embodiments, the predetermined time period may be determined according to actual needs. For example, the processor 210 may determine the predetermined time period based on factors such as data processing ability, processing efficiency, and the display of the smooth movement. Thus, the processor 210 may determine the number of predicted locations for the vehicle. Merely for illustration purposes, the predetermined time period may be 5 seconds. If a bus on Bus Line 102 uploads a last real-time location at 3:00:00, the last uploading time point may be 3:00:00, the terminal device may display the vehicle identification information at the last real-time location on the route of Bus Line 102. The vehicle identification information herein may be used to mark the location of the vehicle on a map. For example, the vehicle identification information may be presented in forms of an icon with a shape of a vehicle so as to visually show the current location of the vehicle. If the vehicle does not upload a next real-time location or the uploaded real-time location does not change after 5 seconds, the processor 210 may determine a predicted location for the vehicle. In some embodiments, the processor 210 may determine a predicted location for the vehicle at 3:00:05 based on the last real-time location uploaded by the vehicle and a driving status of one or more neighboring vehicles. Similarly, the processor 210 may determine predicted locations for the vehicle at 3:00:10, 3:00:15, and 3:00:20, respectively. The processor 210 may match the real-time locations uploaded by the vehicle and the predicted locations with the Bus Line 102 on the map, then the real-time locations and the predicted locations may be displayed on the route on the map in a time sequence. Thus, a smooth movement of the vehicle may be displayed on the terminal device.

In different cases, the terminal device may display the real-time locations or the predicted locations based on the route on the map implemented on the terminal device. Due to different possible errors in data uploading or positioning, the real-time locations uploaded by the vehicle or the predicted locations may not fall exactly on the route, which may require the terminal device to display such locations by matching the locations with a preset route (e.g., projecting the locations to the preset route). In some embodiments, the processor 210 (or the terminal device) may further determine track points which are closest to the real-time locations on the route and the predicted locations for the vehicle from all the track points on the route at an end of a predetermined time period (i.e., the prediction generating time point) in 806. The terminal device may display all the determined track points on the map in a time sequence.

In some embodiments, the display of the smooth movement of the vehicle along a driving path on the map may be realized by projecting the predicted locations and the uploaded real-time locations to the route of the vehicle. In some embodiments, an animation display technology may be utilized to display the smooth movement of the vehicle.

In some embodiments, the processor 210 may obtain driving data of the vehicle by performing a statistical analysis of driving data of one or more neighboring vehicles, such as taxis or buses. The processor 210 may use the driving data of the one or more neighboring vehicles to estimate a predicted location of the vehicle after a predetermined time period. Merely by ways of example, the driving data of the neighboring vehicles may include velocities of the neighboring vehicles. In some embodiments, a predicted location for the vehicle determined based on driving data of the one or more neighboring vehicles can reflect the real-time location of the vehicle more accurately, thus improving the accuracy and reliability of the smooth movement displayed on the terminal device effectively.

In some embodiments, the driving data of the one or more neighboring vehicles associated with the vehicle may include durations of the one or more neighboring vehicles to traverse one or more parts of the route. In some embodiments, the processor 210 may determine a predicted distance that the vehicle travels from the last uploading time point to a prediction generating time point based on the durations of the one or more neighboring vehicles to traverse one or more parts of the route. The processor 210 may determine the predicted location of the vehicle on the route at the prediction generating time point based on the predicted distance and the last real-time location.

In some embodiments, the processor 210 may determine the predicted distance from the last uploading time point to the prediction generating time point for the vehicle based on a prediction model. For example, the processor 210 may obtain a training set including historical data related to different parts of the route. The historical data may include historical durations of one or more vehicles to traverse the different parts of the route of the vehicle. The historical data may further include, for example, a historical time point, a historical weather condition, a historical road condition (e.g., congested or uncongested), or the like, or any combination thereof. In some embodiments, the processor 210 may train the prediction model using the training set according to a machine learning algorithm. The machine learning algorithm may include a linear regression algorithm, a regression decision tree algorithm, an iteration decision tree algorithm, a random forest algorithm, or the like, or any combination thereof. Details regarding the determination of the predicted locations for the vehicle may be found elsewhere in the present disclosure, for example, FIGS. 9-13 and the descriptions thereof.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 9:
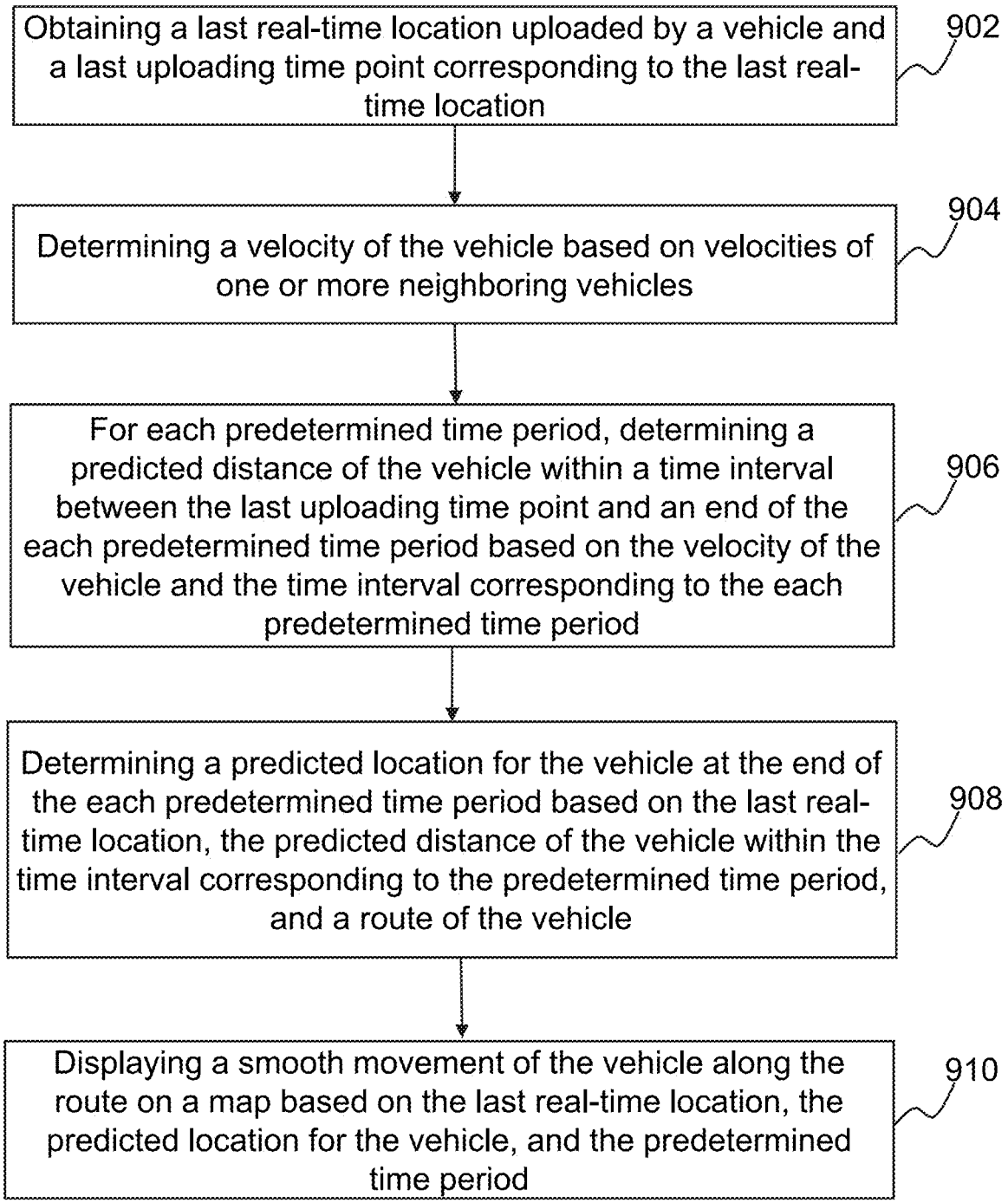
FIG. 9 is a flowchart illustrating an exemplary process for displaying a smooth movement of a vehicle according to some embodiments of the present disclosure.

FIG. 9 is a flowchart illustrating an exemplary process for displaying a smooth movement of a vehicle according to some embodiments of the present disclosure. In some embodiments, the process 900 shown in FIG. 9 may be implemented in the transportation information system 100 illustrated in FIG. 1. For example, at least a part of the process 900 may be stored in a storage medium (e.g., the nonvolatile storage 250 of the electronic device 200) as a form of instructions, and invoked and/or executed by the server 110 (e.g., the processor 210 of the electronic device 200, or one or more modules illustrated in FIGS. 4-6). In some embodiments, a part of the process 900 may be implemented on a terminal device. The operations of the illustrated process 900 presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting. In an implementable method, the processor 210 may determine the predicted location for the vehicle at an end of a predetermined time period (e.g., the prediction generating time point) based on the driving data, a time interval between the last uploading time point and the end of a last predetermined time period, and the last real-time location uploaded by the vehicle. In some embodiments, operations 902 and 910 may be implemented in a similar manner as operations 802 and 806 in FIG. 8, respectively.

In 904, the processor 210 may determine a velocity of the vehicle based on velocities of one or more neighboring vehicles.

In some embodiments, the processor 210 may obtain driving data including the velocities of the one or more neighboring vehicles via communicating with one or more service providers over a network (e.g., the network 140). Merely by ways of example, the processor 210 may determine an average velocity based on the velocities of the one or more neighboring vehicles, and designate the average velocity as the velocity of the vehicle. In some embodiments, the processor 210 may determine a velocity of the vehicle for each predetermined time period (e.g., at the start of the each predetermined time period).

In 906, for each predetermined time period, the processor 210 may determine a predicted distance of the vehicle within a time interval between the last uploading time point and the end of the each predetermined time period based on the velocity of the vehicle and the time interval corresponding to the each predetermined time period.

For instance, if a bus uploads a last real-time location at 3:00:00, and the predetermined time period is 5 seconds, a current predetermined time period may end at 3:00:05, and a next predetermined time period may end at 3:00:10. The time interval from the last uploading time point to an end of the current predetermined time period (i.e., the prediction generating time point) may be 5 seconds (from 3:00:00 to 3:00:05). The time interval from the last uploading time point to an end of the next predetermined time period may be 10 seconds (from 3:00:00 to 3:00:10). The processor 210 may determine the predicted distance of the vehicle within a time interval from the last uploading time point to an end of each predetermined time period (i.e., the prediction generating time point) based on the velocity of the vehicle.

In 908, the processor 210 may determine a predicted location for the vehicle at the end of the each predetermined time period (i.e., the prediction generating time point) based on the last real-time location, the predicted distance of the vehicle within the time interval from the last uploading time point to an end of the each predetermined time period, and a route of the vehicle.

Merely by ways of example, after the processor 210 obtains the last real-time location uploaded by the vehicle at a last uploading time point, the processor 210 may obtain velocities of one or more neighboring vehicles associated with the vehicle based on the last real-time location, and determine a velocity of the vehicle. For each predetermined time period, the processor 210 may determine a predicted distance of the vehicle within the time interval between the last uploading time point and the end of the each predetermined time period (i.e., the prediction generating time point) based on the velocity of the vehicle and the time interval between the last uploading time point and the end of the each predetermined time period. The processor 210 may determine a possible location at which the vehicle may be located at a prediction generating time point (i.e., a predicted location) based on the last real-time location uploaded by the vehicle and the predicted distance. In some embodiments, a predetermined time period may start from the last uploading time point, and end at the prediction generating time point. In some embodiments, the end of a last predetermined time period may be the start of a current predetermined time period.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 10:
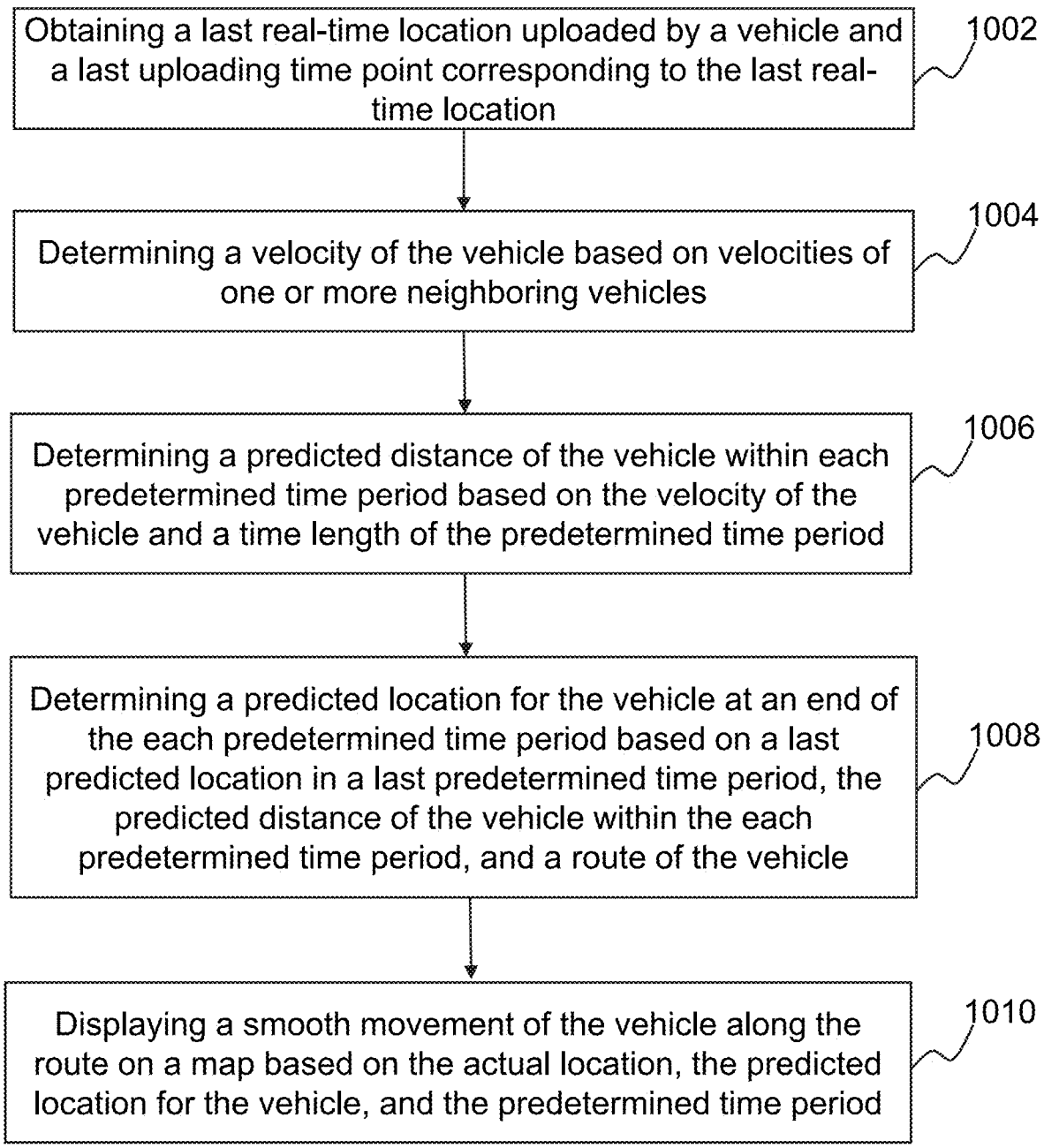
FIG. 10 is a flowchart illustrating an exemplary process for displaying a smooth movement of a vehicle according to some embodiments of the present disclosure.

FIG. 10 is a flowchart illustrating an exemplary process for displaying a smooth movement of a vehicle according to some embodiments of the present disclosure. In some embodiments, the process 1000 shown in FIG. 10 may be implemented in the transportation information system 100 illustrated in FIG. 1. For example, at least a part of the process 1000 may be stored in a storage medium (e.g., the nonvolatile storage 250 of the electronic device 200) as a form of instructions, and invoked and/or executed by the server 110 (e.g., the processor 210 of the electronic device 200, or one or more modules illustrated in FIGS. 4-6). In some embodiments, a part of the process 1000 may be implemented on a terminal device. The operations of the illustrated process 1000 presented below are intended to be illustrative. In some embodiments, the process 1000 may be accomplished with one or more additional operations not described, and/or without one or more of the operations discussed. Additionally, the order in which the operations of the process 1000 as illustrated in FIG. 10 and described below is not intended to be limiting. In an implementable method, the processor 210 may determine the predicted location for the vehicle at an end of a predetermined time period based on the driving data, the time length of the predetermined time period, and the last real-time location uploaded by the vehicle. In some embodiments, as shown in FIG. 10, operations 1002, 1004 and 1010 may be implemented in a similar manner as operations 902, 904, and 910 in FIG. 9, respectively.

In 1006, the processor 210 may determine a predicted distance of the vehicle within each predetermined time period based on the velocity of the vehicle and a time length of the predetermined time period.

In some embodiments, the processor 210 may determine the predicted distance of the vehicle based on a motion of the vehicle at a constant velocity. Thus, the predicted distance may be equal to a product of the velocity of the vehicle and a time length of the predetermined time period.

In 1008, the processor 210 may determine a predicted location for the vehicle at an end of the each predetermined time period based on a last predicted location in a last predetermined time period, the predicted distance of the vehicle within the each predetermined time period, and a route of the vehicle.

Merely by ways of example, if the predetermined time period is 5 seconds, and the processor 210 has determined a last predicted location at the end of a last predetermined period at 3:00:05, the processor 210 may determine a currently predicted location at 3:00:10. In some embodiments, the processor 210 may determine the currently predicted location at 3:00:10 based on the last predicted location at 3:00:05, the predicted distance of the vehicle within each predetermined time period, and a route of the vehicle.

Merely by ways of example, after obtaining the last real-time location uploaded by the vehicle at the last uploading time point, the processor 210 may obtain velocities of one or more neighboring vehicles associated with the vehicle based on the last real-time location, and determine a velocity of the vehicle. The processor 210 may determine a predicted distance of the vehicle within each predetermined time period based on the velocity of the vehicle and the predetermined time period. For a predetermined time period, the processor 210 may determine a possible location at which the vehicle may be located at a prediction generating time point (i.e., a predicted location) based on the predicted location for the vehicle at an end of a last predetermined time period. The prediction generating time point may be an end of the current predetermined time period.

According to the embodiments shown in FIG. 9 and FIG. 10, the processor 210 may determine one or more predicted locations for the vehicle, and the terminal device may display the smooth movement of the vehicle. This may allow a user to visually know real-time locations and/or driving status of the vehicle. The user may include a potential passenger, an administrator that monitors and/or manages the vehicle, etc. Further, in some embodiments, since the predicted locations may change with time deviation, there may be an error of the predicted locations. For example, the predicted location of the vehicle at 3:00:16 may be behind the predicted location of the vehicle at 3:00:13. This error can be avoided by implementing the operations described in FIG. 10. In some embodiments, in the process 1000, the processor 210 may determine the predicted location for each predetermined time period based on the last predicted location in a last predetermined time period, so that errors due to the time deviation can be avoided. Further, the map may be divided into a plurality of grids with a certain granularity. The processor 210 may obtain a location of an icon (e.g., an icon with the shape of a vehicle) in the grids of the map, and determine the predicted location of the icon for each predetermined time period based on the last predicted location of the vehicle in the grids in a last predetermined time period. Thus, the processor 210 may ensure that the predicted location of the icon for each predetermined time period is behind the last predicted location in the last predetermined time period.

According to the method for displaying the smooth movement of the vehicle provided by the present disclosure, when the uploading frequency of real-time locations of a vehicle does not meet a predetermined frequency, the processor 210 may determine a driving status of the vehicle based on one or more neighboring vehicles. The processor 210 may determine a predicted location for each predetermined time period. The terminal device may display the real-time locations and the driving path of the vehicle on the route of the vehicle on a map. In some embodiments, the terminal device may display the smooth movement of the vehicle on the route in a form of animation, thus allowing the user to visually know the current locations and driving status of the vehicle. This may effectively relieve the user's anxiety in a waiting process. The user may also predict an arrival time of the vehicle, and arrange his or her own time accordingly.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 11:
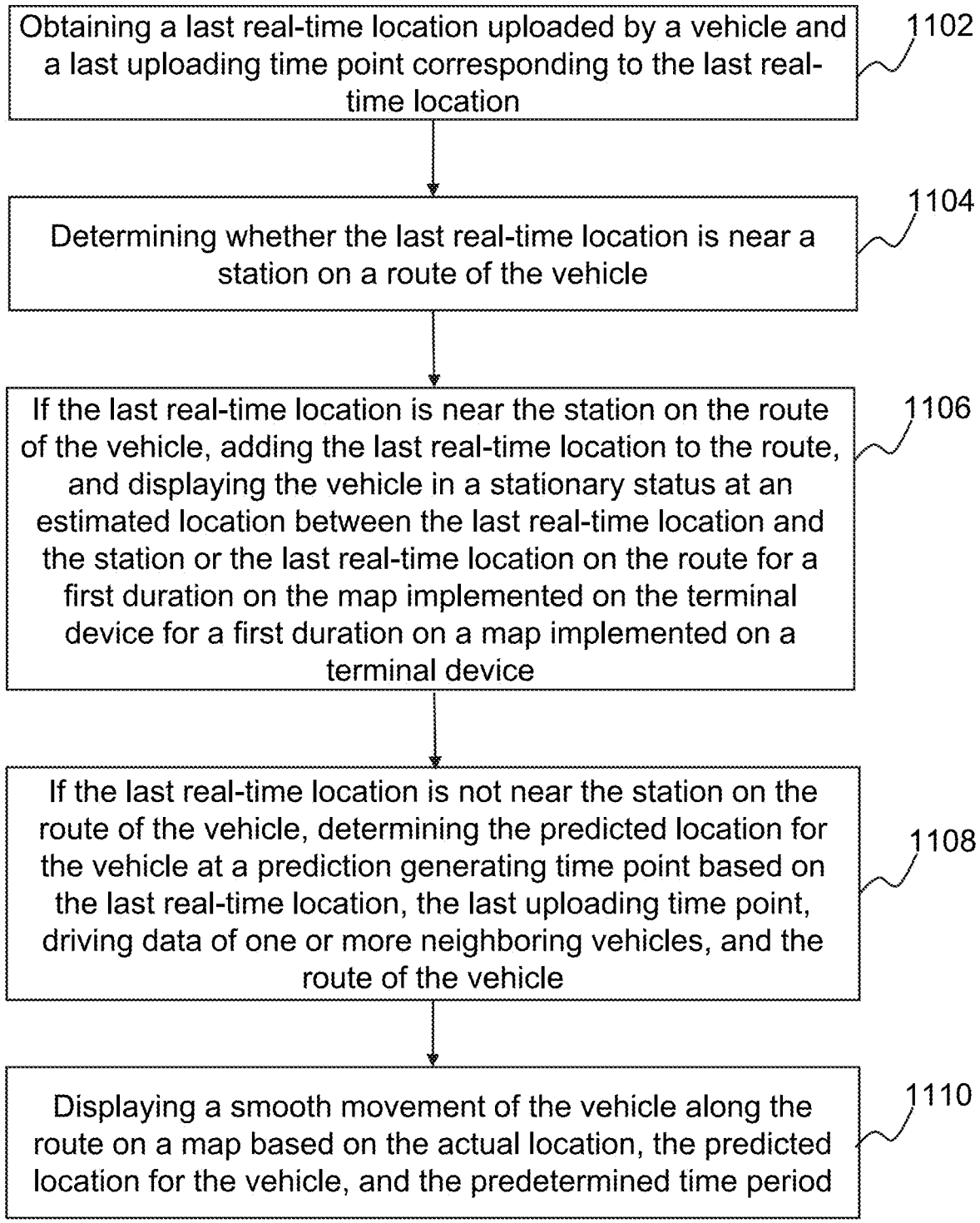
FIG. 11 is a flowchart illustrating an exemplary process for displaying a smooth movement of a vehicle according to some embodiments of the present disclosure.

FIG. 11 is a flowchart illustrating an exemplary process for displaying a smooth movement of a vehicle according to some embodiments of the present disclosure. In some embodiments, the process 1100 shown in FIG. 11 may be implemented in the transportation information system 100 illustrated in FIG. 1. For example, at least a part of the process 1100 may be stored in a storage medium (e.g., the nonvolatile storage 250 of the electronic device 200) as a form of instructions, and invoked and/or executed by the server 110 (e.g., the processor 210 of the electronic device 200, or one or more modules illustrated in FIGS. 4-6). In some embodiments, a part of the process 1100 may be implemented on a terminal device. The operations of the illustrated process 1100 presented below are intended to be illustrative. In some embodiments, the process 1100 may be accomplished with one or more additional operations not described, and/or without one or more of the operations discussed. Additionally, the order in which the operations of the process 1100 as illustrated in FIG. 11 and described below is not intended to be limiting. In actual scenarios, there may be some cases in which the vehicle does not move on a congested road segment or stops (e.g., near a station or before a red traffic light), and thus there is no need to determine the predicted locations. In some embodiments, the processor 210 may determine the driving status of the vehicle based on a congestion status of different parts of the route and a geographical location of the vehicle. In some embodiments, as shown in FIG. 11, operations 1102 and 1110 may be implemented in a similar manner as operations 802 and 806 in FIG. 8.

In 1104, the processor 210 may determine whether the last real-time location is near a station on the route of the vehicle.

In 1106, if the last real-time location is near the station on the route of the vehicle, the processor 210 may add the last real-time location to the route, and the terminal device may display the vehicle in a stationary status at an estimated location between the last real-time location and the station or the last real-time location on the route for a first duration on the map implemented on the terminal device.

In 1108, if the real-time location is not near the station on the route of the vehicle, the processor 210 may determine the predicted location for the vehicle at a prediction generating time point based on the last real-time location, the last uploading time point, driving data of one or more neighboring vehicles, and the route of the vehicle.

Merely by ways of example, after the processor 210 obtains the last real-time location uploaded by the vehicle at the last uploading time point, the processor 210 may determine whether the real-time location is near a station on a route of the vehicle. If the real-time location is near the station on the route of the vehicle, it may indicate that the vehicle may stop at the station, and there is no need to determine a predicted location. The terminal device may directly display the last real-time location on the map implemented on the terminal device and display the vehicle in a stationary status. If the real-time location is not near the station on the route of the vehicle, the processor 210 may determine a predicted location for the vehicle at an end of the predetermined time period. The terminal device may display a smooth movement of the vehicle along the route on the map from the last real-time location to the predicted location for the vehicle.

In some embodiments, the processor 210 may determine a distance between the last real-time location and a station near the route. The processor 210 may determine whether the distance is shorter than a distance threshold. In response to the determination that the distance is shorter than the distance threshold, the terminal device may display the vehicle in a stationary status on the map. In some embodiments, the terminal device may display the vehicle at the last real-time location or an estimated location between the last real-time location and the station for a first duration on the map. In some embodiments, the distance threshold may be, for example, 5 meters, 10 meters, 20 meters, 25 meters, etc. In some embodiments, the first duration may start from a time point when the distance between the last real-time location (or a predicted location) and the station is shorter than the distance threshold, and end at a time point when a distance between a current real-time location and the station is greater than or equal to the distance threshold. In some embodiments, the first duration may be a preset time period, such as 30 seconds, 45 seconds, etc.

According to the above embodiment, the processor 210 may determine that the vehicle stops at a station when the last real-time location uploaded by the vehicle currently is near a station on a route of the vehicle. In addition, the processor 210 may determine whether the vehicle is stationary based on one or more neighboring vehicles. For example, if the processor 210 determines that one or more neighboring vehicles are also stationary, the vehicle may be in a stationary status due to a congestion or a red traffic light. If the vehicle is in a stationary status due to congestion or a red traffic light, the processor 210 may add the last real-time location to the route, and display the vehicle in a stationary status at an estimated location between the last real-time location and the station or the last real-time location on the route for a first duration on the map implemented on the terminal device. In these cases, the processor 210 may not need to determine a predicted location for the vehicle. The terminal device may display the vehicle in a stationary status on the route of the map implemented on the terminal device.

In addition, since the route of the vehicle is predetermined by, for example, an administrator of the transportation information system 100, the processor 210 may also correct the real-time location uploaded by the vehicle or the predicted location based on the route according to some embodiments in FIG. 12. For example, the processor 210 may correct the real-time location uploaded by the vehicle or the predicted location based on a predetermined bus route.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

FIG. 12 is a flowchart illustrating an exemplary process for displaying a smooth movement of a vehicle according to some embodiments of the present disclosure. In some embodiments, the process 1200 shown in FIG. 12 may be implemented in the transportation information system 100 illustrated in FIG. 1. For example, at least a part of the process 1200 may be stored in a storage medium (e.g., the nonvolatile storage 250 of the electronic device 200) as a form of instructions, and invoked and/or executed by the server 110 (e.g., the processor 210 of the electronic device 200, or one or more modules illustrated in FIGS. 4-6). In some embodiments, a part of the process 1200 may be implemented on a terminal device. The operations of the illustrated process 1200 presented below are intended to be illustrative. In some embodiments, the process 1200 may be accomplished with one or more additional operations not described, and/or without one or more of the operations discussed. Additionally, the order in which the operations of the process 1200 as illustrated in FIG. 12 and described below is not intended to be limiting. In some embodiments, the real-time location of the vehicle may be inaccurate. For example, a current real-time location uploaded by the vehicle may be behind a last uploaded real-time location on the route along the driving direction of the vehicle, thus, leading to a faked U turn. In some embodiments, operations 1202, 1206 and 1208 in FIG. 12 may be implemented in a similar manner as operations 802, 804 and 806 in FIG. 8, respectively.

In 1204, for all the real-time locations uploaded by the vehicle, if a currently uploaded real-time location (also referred to as "current real-time location") is behind a last uploaded real-time location (also referred to as "last real-time location") on the route along the driving direction of the vehicle, the processor 210 may discard the currently uploaded real-time location.

As used herein, "ahead" and "behind" may be determined according to a moving direction of the vehicle. The moving direction of the vehicle is "ahead", and a direction opposite to the moving direction of the vehicle is "behind". In some embodiments, a bus on a certain Bus line may travel one-way along the route, and thus the processor 210 may correct inaccurate real-time locations based on the route. For example, the inaccurate real-time locations may be discarded. According to the embodiments described above, the processor 210 may filter the obtained real-time locations in advance, thus improving accuracy of the display of the smooth movement of the vehicle on the terminal device. In some embodiments, if a currently predicted location is behind a last predicted location on a route along the driving direction of the vehicle, the processor 210 may discard the currently predicted location.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 13:
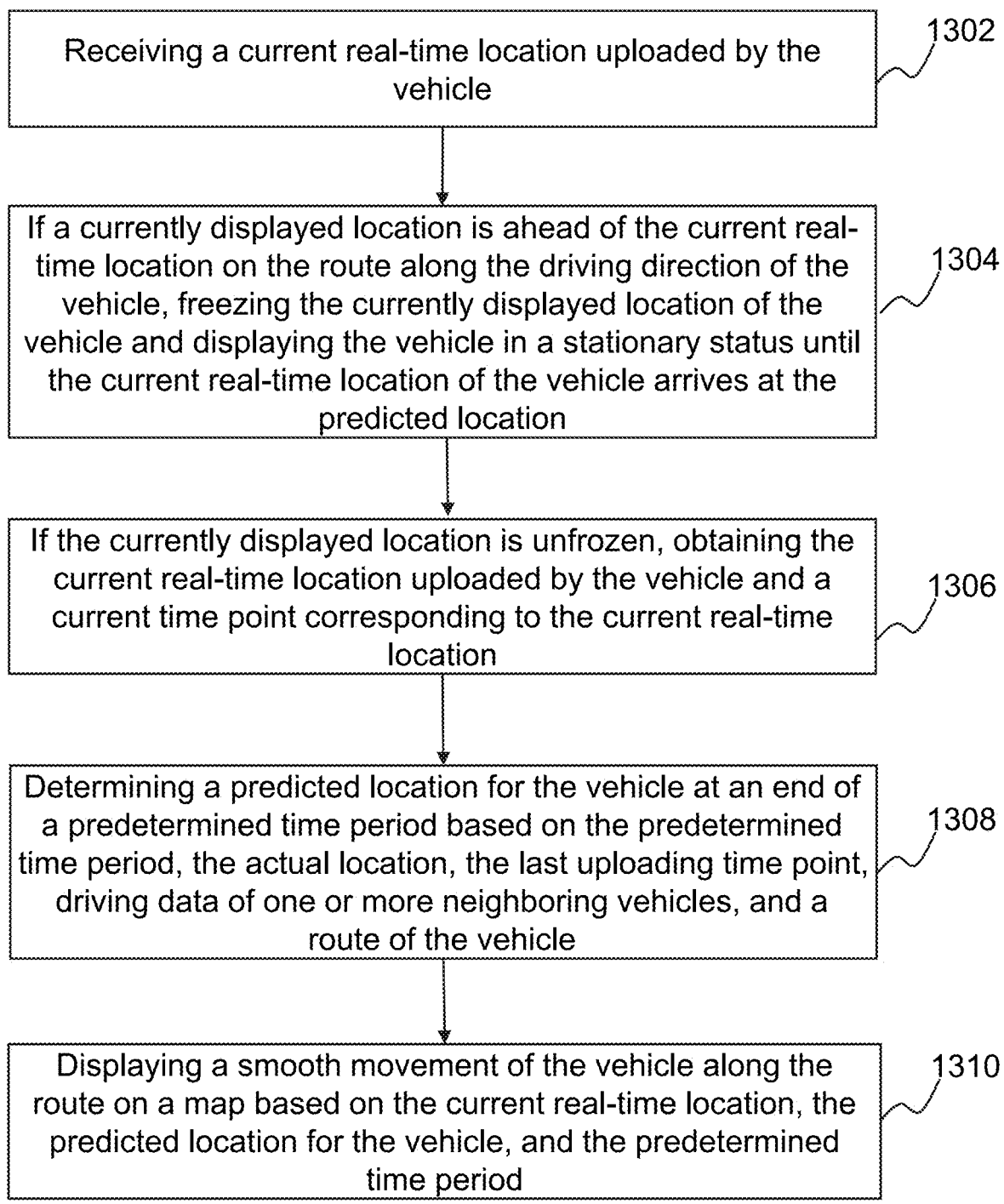
FIG. 13 is a flowchart illustrating an exemplary process for displaying a smooth movement of a vehicle according to some embodiments of the present disclosure.

FIG. 13 is a flowchart illustrating an exemplary process for displaying a smooth movement of a vehicle according to some embodiments of the present disclosure. In some embodiments, the process 1300 shown in FIG. 13 may be implemented in the transportation information system 100 illustrated in FIG. 1. For example, at least a part of the process 1300 may be stored in a storage medium (e.g., the nonvolatile storage 250 of the electronic device 200) as a form of instructions, and invoked and/or executed by the server 110 (e.g., the processor 210 of the electronic device 200, or one or more modules illustrated in FIGS. 4-6). In some embodiments, a part of the process 1300 may be implemented on a terminal device. The operations of the illustrated process 1300 presented below are intended to be illustrative. In some embodiments, the process 1300 may be accomplished with one or more additional operations not described, and/or without one or more of the operations discussed. Additionally, the order in which the operations of the process 1300 as illustrated in FIG. 13 and described below is not intended to be limiting. In some embodiments, there may be an error in the predicted location of the vehicle. For example, since the predicted location is determined based on the predetermined time period and the driving data of the vehicle, there may be an error between the predicted location of the vehicle and the real-time location of the vehicle. Merely by ways of example, a current real-time location uploaded by the vehicle may be behind a last predicted location. In some embodiments, as shown in FIG. 13, operations 1308 and 1310 may be implemented in a similar manner as operations 806 and 808 in FIG. 8, respectively.

In 1302, the processor 210 may receive a current real-time location uploaded by the vehicle. The current real-time location may refer to a real-time location uploaded at a current time point.

In 1304, if a currently displayed location is ahead of the current real-time location on the route along the driving direction of the vehicle, the processor 210 may freeze the currently displayed location and display the vehicle in a stationary status until the current real-time location of the vehicle arrives at the predicted location. The currently displayed location may refer to a location of the vehicle that is currently displayed on a map implemented on the terminal device. In some embodiments, the currently displayed location may be a predicted location. In some embodiments, the currently displayed location may be a last real-time location uploaded by the vehicle.

In 1306, if the currently displayed location is unfrozen, the processor 210 may obtain the current real-time location uploaded by the vehicle and a current time point corresponding to the current real-time location.

For example, if a bus uploads a real-time location at 3:00:10 (i.e., a last real-time location), the processor 210 may determine a predicted location for the bus after 5 seconds. However, the real-time location uploaded by the bus at 3:00:15 (i.e., a current real-time location) may be behind the predicted location at 3:00:15, which may be because the bus does not arrive at the predicted location at 3:00:15. In some embodiments, the predicted location is displayed on the terminal device. In this case, the terminal device may display the vehicle in a stationary status until the current real-time location of the vehicle arrives at the currently displayed location (e.g., the predicted location). For example, an icon representing the vehicle on the map implemented on the terminal device may be stationary until the current real-time location of the vehicle arrives at the predicted location. Then the terminal device may continue to display a smooth movement of the vehicle according to the processes described above (e.g., the process 900 and/or the process 1000). In this way, a zigzag movement or a back and forth movement of the vehicle on the map may be avoided.

According to the embodiment described in the process 1300, when the vehicle does not arrive at a predicted location at a certain time point, the terminal device may display the vehicle in a stationary status until the real-time location of the vehicle arrives at the predicted location. The terminal device may continue to display a smooth movement of the vehicle. Thus, the smooth movement of the vehicle may be realized without turning back.

In some embodiments, the processor 210 may verify real-time locations uploaded by the vehicle (e.g., a last real-time location and/or a current real-time location) or a predicted location determined by the processor 210 based on scene related information associated with a driving path of the vehicle. For example, the information acquisition device 130 may obtain the scene related information from an image, a video, an audio, etc. In some embodiments, the processor 210 may identify a target object from the image, the video and/or the audio, and determine a location of the target object on the map. The target object may include a shopping center, a restaurant, a city statue, a street name and number, etc. The processor 210 may correct the real-time locations and/or the predicted location based on the determined location of the target object. Details regarding the correction of the locations and/or driving paths of the vehicle will be described in connection with FIG. 21.

It should be noted that the above processes 1200 and 1300 may be performed separately or jointly. In some embodiments, when the vehicle is turning around a corner on a road or passing through a crossroad, the processor 210 may determine coordinates of one or more inflection points of the vehicle during a turning process based on a given route. As used herein, the inflection points may be turning points along the corner or the crossroad of the route on the map. In some embodiments, the turning angles for the vehicle between different inflection points may be different. Thus, the terminal device may display a smooth turning curve of the vehicle instead of a straight moving line. On the basis of any of the above embodiments, the method of displaying a smooth movement of the vehicle may further include determining one or more inflection points of the vehicle related to a corner or a crossroad of the route. In some embodiments, an inflection point supplementation solution may be adopted to further smooth the turning path. In some embodiments, the processor 210 may need to perform the inflection point supplementation solution based on a given route, and the terminal device may display the supplemented inflection points on the given route. In this way, a more smooth movement of the vehicle along any route (e.g., including straight line and turning) on the map implemented on the terminal device can be realized, so that the user may intuitively and accurately know the driving status of the vehicle.

Merely by way of example, a backend server (e.g., the server 110) may obtain real-time locations uploaded by a vehicle at intervals of one or more predetermined time period. For those vehicles which can upload a real-time location during each predetermined time period, the terminal device may display one or more real-time locations of the vehicle on the map based on a route of the vehicle, so as to implement a smooth movement. When a current real-time location uploaded at a current time point is behind a last real-time location uploaded at a last time point, the server 110 may correct the current real-time location. For example, the terminal device may display the vehicle in a stationary status at the last real-time location. For a vehicle which cannot upload a real-time location during each predetermined time period, the terminal device may display a last real-time location at a last uploading time point (e.g., a start time point of a predetermined time period) and a predicted location at a prediction generating time point (e.g., an end point of a predetermined time period) on the map based on the route to display a smooth movement of the vehicle. In some embodiments, the server 110 may determine the predicted location for the vehicle at the prediction generating time point based on the driving data of one or more neighboring vehicles. If the vehicle makes a turn, the terminal device may display a smooth movement of the vehicle based on coordinates of the real-time locations (or the predicted locations) and the inflection points of the vehicle on the route. For example, the icon representing the vehicle may demonstrate a smooth turning curve along a corner or a crossroad on the route.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 14:
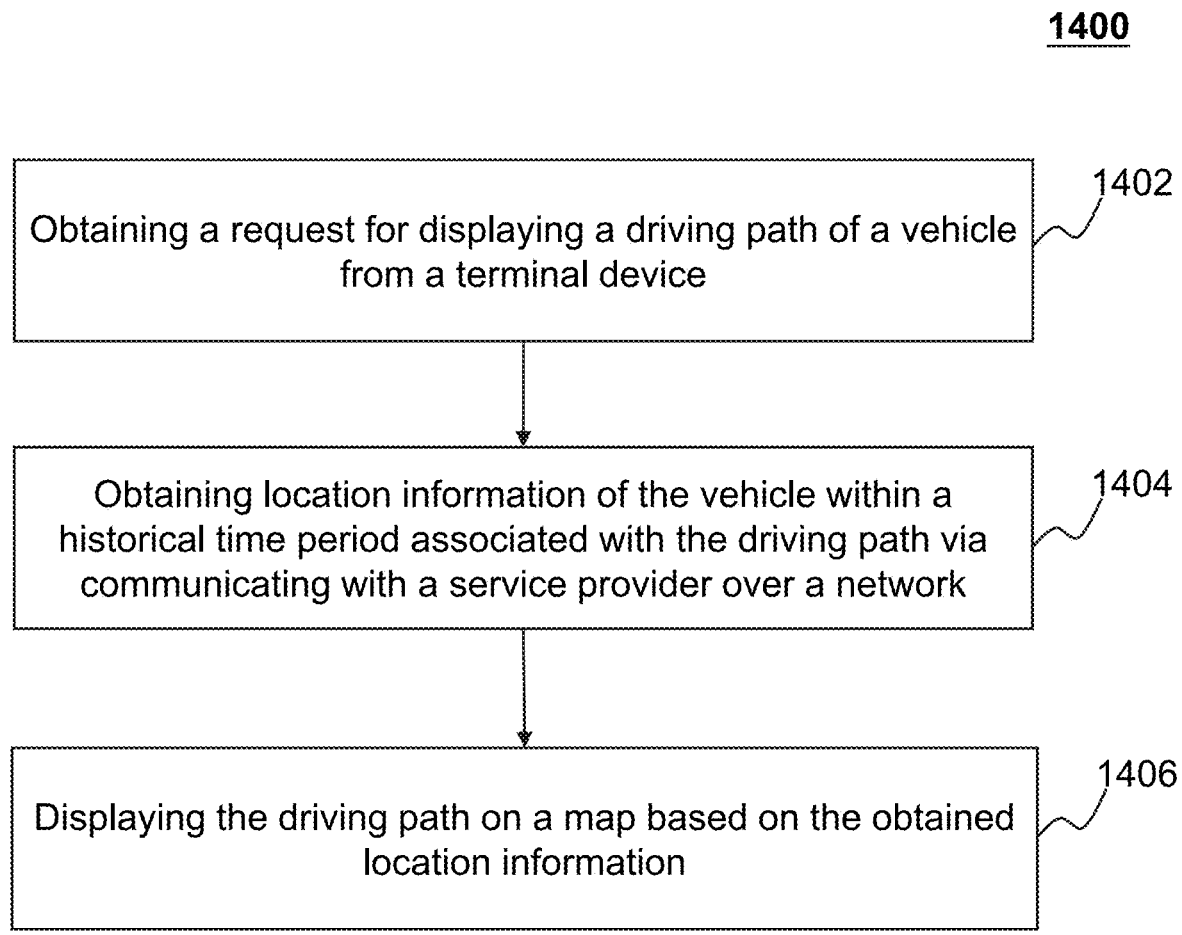
FIG. 14 is a flowchart illustrating an exemplary process for displaying a driving path of a vehicle according to some embodiments of the present disclosure.

FIG. 14 is a flowchart illustrating an exemplary process for displaying a driving path of a vehicle according to some embodiments of the present disclosure. In some embodiments, the process 1400 shown in FIG. 14 may be implemented in the transportation information system 100 illustrated in FIG. 1. For example, at least a part of the process 1400 may be stored in a storage medium (e.g., the nonvolatile storage 250 of the electronic device 200) as a form of instructions, and invoked and/or executed by the server 110 (e.g., the processor 210 of the electronic device 200, or one or more modules illustrated in FIG. 7). In some embodiments, a part of the process 1400 may be implemented on a terminal device. The operations of the illustrated process 1400 presented below are intended to be illustrative. In some embodiments, the process 1400 may be accomplished with one or more additional operations not described, and/or without one or more of the operations discussed. Additionally, the order in which the operations of the process 1400 as illustrated in FIG. 14 and described below is not intended to be limiting.

In 1402, the processor 210 may obtain a request for displaying a driving path of a vehicle from a terminal device.

In some embodiments, the processor 210 may receive a query operation to display a driving path of a vehicle within a historical time period.

In some embodiments, the query operation may be a request for displaying the driving path of the vehicle in real-time. The driving path of the vehicle may be displayed on a terminal device associated with a user, such as a passenger waiting for the vehicle, an administrator, etc. In some embodiments, the processor 210 may obtain real-time locations of the vehicle at a predetermined time interval and the terminal device may display the driving path of the vehicle based on the real-time locations of the vehicle. In some embodiments, the processor 210 may further determine a predicted location of the vehicle at an end of one or more predetermined time periods based on the real-time locations of the vehicle, a velocity of the vehicle and a given route of the vehicle. The processor 210 may match the predicted locations and the real-time locations of the vehicle with the route (e.g., project the predicted locations and the real-time locations of the vehicle to the route) and generate a driving path. The terminal device may display a smooth movement of the vehicle based on the driving path on the map. More details regarding displaying a driving path in real-time may be found elsewhere, for example, in FIGS. 8-13 and the description thereof. For illustration purposes, the process 1400 may be described as an example of receiving a query operation to display a driving path within a historical time period.

In 1404, the processor 210 may obtain location information of the vehicle within the historical time period associated with the driving path via communicating with a service provider over a network.

In some embodiments, the location information may be acquired by an information acquisition device 130 in the vehicle. The location information may also be obtained by any other methods, which is not limited in the present application. In some embodiments, the location information can be acquired by a positioning device that is independent from the information acquisition device 130. The positioning device may include any electronic device with a built-in positioning module, such as a user's mobile phone, tablet computer, laptop computer, or the like.

The location information may include, for example, one or more locations of the vehicle within the historical time period. In some embodiments, the location information may further include one or more time points when the one or more locations of the vehicle were recorded.

In 1406, a terminal device may display the driving path of the vehicle on a map (e.g., implemented on the terminal device) based on the obtained location information.

In some embodiments, the terminal device may dynamically display a generating process of the driving path according to an actual driving path generating speed of the vehicle or a displaying ratio with respect to the actual driving path generating speed. For example, an icon representing a vehicle may dynamically move on the map, and form a continuous driving path. The displaying ratio may be set and adjusted according to actual conditions. For example, when the displaying ratio is less than 1, the driving path is displayed in a speed slower than the driving path generating speed. As another example, when the displaying ratio is larger than 1, the driving path is displayed in a speed faster than the driving path generating speed. The displaying ratio can be predefined or dynamically adjusted, for example, according to default settings or adjustment by a user during an actual displaying process of a driving path of a vehicle.

As various situations may exist during the driving process of the vehicle within the historical time period, the processor 210 may divide the driving path of the vehicle into a plurality of segments. The terminal device may display the divided segments with different displaying properties for the plurality of segments. For example, different displaying properties may be applied to at least two neighboring segments, so that a user (e.g., an administrator) can identify or distinguish different segments according to the displaying properties quickly and accurately. This may improve the viewing efficiency of the driving path of the vehicle. The displaying properties may include brightness of color, hue of color, thickness of a driving path, or the like, or a combination thereof.

In some embodiments, the method for dividing the driving path of the vehicle into a plurality of segments may include dividing the driving path into a plurality of segments based on traffic conditions, time information, driver information, driving data, or the like, or any combination thereof.

In some embodiments, the processor 210 may divide the driving path into a plurality of segments according to a distance travelled by a vehicle within a preset unit time. For example, the unit time may be two hours. If the processor 210 receives a request for displaying a driving path of a vehicle within a historical time period from 8:00 to 16:00, the processor 210 may divide the driving path of the vehicle within the historical time period into four segments, each of which having a distance traveled by the vehicle in every two hours sequentially from 8:00 to 16:00. In some embodiments, at least two neighboring segments may have different displaying properties. In some embodiments, each segment may have a different displaying property, so that segments corresponding to different time segments (e.g., each unit time) can be effectively distinguished. Thus, it may be convenient for the administrator to view and/or manage different segments on the map via a terminal device.

In some embodiments, a plurality of drivers may drive the same vehicle in different time segments within a historical period. For example, the vehicle may be a shared car rented by a plurality of drivers respectively within the historical time period. As another example, a bus company may have a plurality of drivers to work on a certain bus line, and the drivers may shift at any stop along the bus line. The processor 210 may divide the driving path into segments according to different drivers. For example, each of the plurality of route segments may correspond to one of the drivers. For instance, the processor 210 may obtain a request for displaying the driving path of the vehicle within a historical time period from 8:00 to 16:00. The processor 210 may determine that a driver A drives the vehicle from 8:00 to 12:00 and a driver B drives the vehicle from 12:00 to 16:00. For example, the drivers may be identified based on images or videos obtained by the information acquisition device 130 in the vehicle. As another example, the drivers with known identifies may drive the vehicle according to a predetermined time sequence (or a time schedule). The processor 210 may divide the driving path into a first segment on which driver A drives the vehicle from 8:00 to 12:00, and a segment on which driver B drives the vehicle from 12:00 to 16:00. In some embodiments, different displaying properties may be applied to at least two neighboring segments. In some embodiments, each segment may have a certain displaying property different from other segments, so that segments corresponding to different drivers can be effectively distinguished. Thus, it may be convenient for the administrator to view and/or manage different segments on the map via a terminal device.

In some embodiments, traffic conditions may vary during a driving process of a vehicle. Thus, the processor 210 may divide the driving path into a plurality of segments according to traffic conditions during the driving process of the vehicle. For example, the processor 210 may obtain the information related to traffic conditions from a third party that collects and stores road condition data. The third party may be a Department of Transportation of a country or a city. For example, the processor 210 may obtain a request for displaying the driving path of a vehicle within a historical time period from 6:00 to 12:00. A traffic condition during the driving process from 6:00 to 8:00 may be uncongested. A traffic condition during the driving process from 8:00 to 10:00 may be congested. A traffic condition during the driving process from 10:00 to 12:00 may be heavily congested. The processor 210 may divide the driving path into three segments corresponding to the traffic conditions of the three time segments. In some embodiments, words or symbols may be used to describe the traffic conditions. For instance, the three segments may correspond to "The traffic condition from 6:00 to 8:00 is uncongested", "The traffic condition from 8:00 to 10:00 is congested", and "The traffic condition in 6:00 to 8:00 is heavily congested", respectively. In some embodiments, different displaying properties may be applied to at least two neighboring segments. In some embodiments, each segment may have a different displaying property, so that segments corresponding to different traffic conditions can be effectively distinguished. Thus, it may be convenient for the administrator to view and/or manage different segments.

In some embodiments, the processor 210 may divide the driving path into the plurality of segments based on the driving data of the vehicle. In some embodiments, the driving data may include a velocity of the vehicle, an accelerated velocity of the vehicle, etc. For instance, the processor 210 may divide the driving path based on a plurality of velocity ranges, such as 0-20 km/h, 20-40 km/h, 40-60 km/h, etc. A user (e.g., an administrator or a driver of the vehicle) may get to know more details relating to the driving status of the vehicle along the driving path according to the plurality of segments determined based on the driving data. It should be noted that the driving path may also be divided into a plurality of segments based on other types of driving data, which is not limited by the present disclosure.

In some embodiments, the processor 210 may obtain abnormal events of a vehicle within the historical time period, and add certain labels to mark the corresponding abnormal events to locations on the driving path where the abnormal events occur. For example, the abnormal events may include an abrupt brake, a sudden acceleration, a sharp turn, an overspeed behavior, or the like, or any combination thereof. Marking the abnormal events for the vehicle during the driving process on the driving path may allow the driver, the passenger or an administrator to view the abnormal events more intuitively and conveniently.

In some embodiments, the processor 210 may obtain scene related information associated with a vehicle acquired by the information acquisition device 130 within a historical time period. The scene related information may include image information related to scenes along the driving path of the vehicle, video information related to scenes along the driving path of the vehicle, audio information related to scenes along the driving path of the vehicle, or the like, or a combination thereof. When the processor 210 obtains a selection operation of a certain time point within the historical time period, the processor 210 may display an image corresponding to the time point or play a video or an audio started from the time point. Additionally or alternatively, when the processor 210 obtains a selection operation of a sub-period within the historical time period (e.g., a sub-period of 9:00-9:30 a.m. within a historical time period 8:00 a.m.-12:00 a.m.), the processor 210 may play a video or an audio corresponding to the sub-period. The combination of the driving path and the scene related information such as images, sounds or the like during the driving process of the vehicle may allow the administrator to view the driving path and the scene related information more conveniently. Thus the efficiency for managing the vehicle may be improved.

In some embodiments, the processor 210 may verify the location information based on the scene related information. The processor 210 may identify one or more target objects on the driving path of the vehicle based on the scene related information and determine whether the location information of the vehicle needs to be corrected based on the target objects on the driving path. For example, if a location indicated by the location information of the vehicle corresponding to a time point is different from a location of the target object identified or inferred from the scene related information acquired at the same time, the processor 210 may determine that the location information of the vehicle corresponding to the time point need to be corrected. If the location information of the vehicle associated with the driving path needs to be corrected, the processor 210 may correct the location information of the vehicle corresponding to the time point based on the location of the target objects.

In some embodiments, in order to improve the accuracy of the displayed driving path, the processor 210 may correct location information related to the driving path based on the acquired image information, video information and/or audio information. Merely for illustration purposes, the processor 210 may identify a target object captured in the image or the video, so as to determine geographic location information (e.g., coordinates of geographic locations) corresponding to the target object. For instance, the processor 210 may determine the geographic location information of the target subject using an image identification technology. The processor 210 may correct the location information related to the driving path according to the determined geographic location information of the target object. According to the present disclosure, the displaying accuracy of the driving path based on the uploaded location information can be improved. Details regarding the correction of the location information of the vehicle will also be described in connection with FIG. 21.

In some embodiments, an image acquisition module in the information acquisition device 130 may acquire the image information from image data and/or video data. An audio acquisition module in the information acquisition device 130 may acquire audio information from video data and/or audio data. A positioning module, the image acquisition module, and the audio acquisition module may share a same clock signal of a device to determine time information when the image data, audio data and/or video data are recorded. In some embodiments, the processor 210 may process (i.e., match, sort, group, archive, etc.) the acquired data/information (e.g., location information, image data, video data, audio data, or the like, or any combination thereof) based on the shared clock information.

In some embodiments, the image data, the video data, and the audio data may also be acquired by an electronic device (e.g., a digital video recorder (DVR) that continuously records views through a window of a vehicle) that is independent from the information acquisition device 130. The electronic device and the information acquisition device 130 may use a same clock (e.g., a network clock), or different clocks which are calibrated to have a same time for the electronic device and the information acquisition device 130 such that the location information, the image data, the video data, and the audio data acquired by different devices are synchronized.

In some embodiments, the location information may be acquired by a positioning device that is independent form the information acquisition device 130, and the positioning device may include any electronic device with a built-in positioning module, such as a user's mobile phone, tablet, or the like. The positioning device and the information acquisition device 130 may use a same clock (e.g., a network clock), or different clocks which are calibrated to have a same time for the electronic device and the information acquisition device 130 such that the location information, the image data, the video data, and the audio data acquired by different devices are synchronized.

According to the present disclosure, an information acquisition device 130 in a vehicle may acquire location information within a historical time period. A terminal device may display a driving path dynamically on a map. Thus the administrator can quickly view a driving path of the vehicle within the historical time period. The driving path and scene related information associated with the driving path are combined. The scene related information may include time, images, sounds, speed, etc., recorded during the driving process of the vehicle. Such a combination may reflect a relationship between the scene related information and the continuously changing geographical locations of the vehicle. Therefore, it may be convenient for the administrator to view and/or manage the driving path on a map via a terminal device. Merely for illustration purposes, the processor 210 may obtain a request for displaying a driving path of a vehicle from a terminal device. The processor 210 may obtain location information of the vehicle associated with the driving path via communicating with a service provider over a network. The processor 210 may obtain scene related information associated with the driving path of the vehicle and verify the location information based on the scene related information; and display the driving path of the vehicle based on the verified location information on a map implemented on the terminal device.

In some embodiments, the terminal device may display a real-time driving path on a map implemented on the terminal device and the real-time scene related information associated with the driving path. For example, the terminal device may display an image, a video and/or an audio acquired in real-time by the information acquisition device 130. The driving path may be displayed in the form of a smooth movement of the vehicle dynamically, and the vehicle may be displayed as an icon on the driving path on the map.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 15:
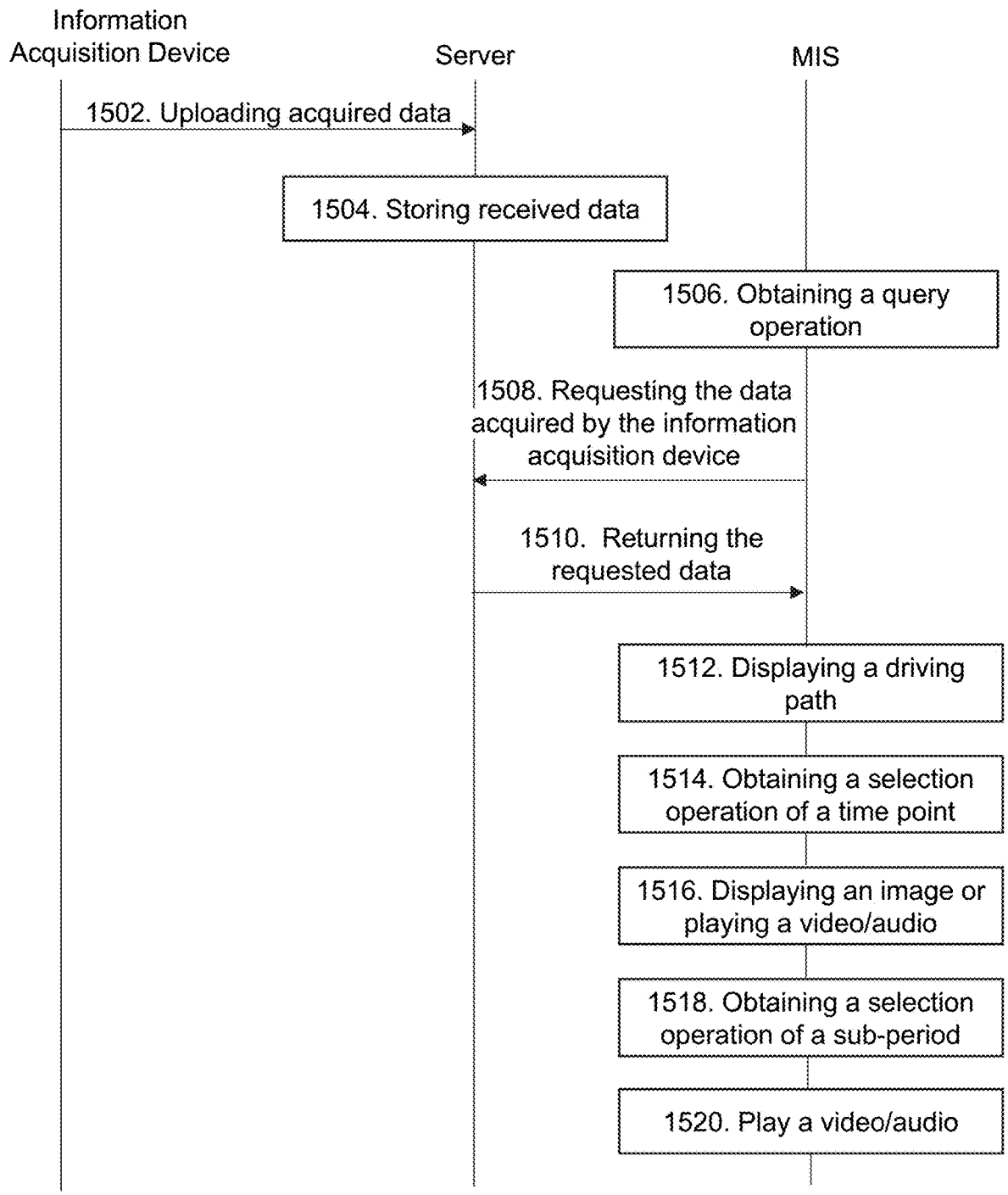
FIG. 15 is a flowchart illustrating an exemplary process for displaying a driving path of a vehicle according to some embodiments of the present disclosure.

FIG. 15 is a flowchart illustrating an exemplary process for displaying a driving path of a vehicle according to some embodiments of the present disclosure. In some embodiments, the process 1500 shown in FIG. 15 may be implemented in the transportation information system 100 illustrated in FIG. 1. For example, at least a part of the process 1500 may be stored in a storage medium (e.g., the nonvolatile storage 250 of the electronic device 200) as a form of instructions, and invoked and/or executed by the server 110 (e.g., the processor 210 of the electronic device 200, or one or more modules illustrated in FIG. 7). In some embodiments, a part of the process 1500 may be implemented on a terminal device. The operations of the illustrated process 1500 presented below are intended to be illustrative. In some embodiments, the process 1500 may be accomplished with one or more additional operations not described, and/or without one or more of the operations discussed. Additionally, the order in which the operations of the process 1500 as illustrated in FIG. 15 and described below is not intended to be limiting. It can be seen that in an implementation of the present application, data interaction among the server (e.g., the server 110), the network management system (e.g., the MIS 120), and one or more information acquisition devices 130 (e.g., the information acquisition device 130-1, 130-2) may be involved. The process 1500 for displaying a driving path of a vehicle will be described below in terms of data interaction.

In 1502, the information acquisition device 130 may upload the acquired data.

In some embodiments, the data uploaded by the information acquisition device 130 may include location information, image data, video data, audio data, and/or speed information. The speed information may include angular speed information and linear speed information. The information acquisition device 130 may upload the acquired data in real-time or at a preset interval. In some embodiments, the information acquisition device 130 may also upload a part of the acquired data in real-time, and upload the other part of the acquired data according to the preset interval. For example, the information acquisition device 130 may upload the location information in real-time, and upload the image data, the video data, the audio data, and the speed information according to the preset interval. It should be appreciated that the examples above are for illustration purpose, and the present disclosure is not intended to be limiting. As an example, other data uploading scheme may also be adopted in the present disclosure.

In 1504, the server 110 may store the received data acquired by the information acquisition device 130.

In 1506, the MIS 120 may obtain a query operation of a driving path of a vehicle within a historical time period.

In some embodiments, the query operation may be a request for displaying the driving path of a vehicle on a terminal device within a historical time period or in real-time. The request may be made by a user, such as a passenger waiting for the vehicle, an administrator, etc. The MIS 120 may be implemented on the terminal device, and may display the driving path of the vehicle and scene related information within the historical time period or in real-time. For illustration purposes, the process 1500 may be described in a case of receiving a query operation of a driving path within a historical time period.

In some embodiments, when a user (e.g., an administrator) needs to display a driving path of a vehicle within a historical time period, the processor 210 may obtain the query operation of the administrator, and obtain the location information within the historical time period acquired by the information acquisition device 130 equipped in a vehicle. The MIS 120 may display the driving path on a map according to the location information returned by the server 110.

In 1508, the MIS 120 may request the data acquired by the information acquisition device 130 within the historical time period.

In 1510, the server 110 may return the requested data to the MIS 120.

In some embodiments, the server 110 may only return the location information acquired by the information acquisition device 130 within the historical time period to the MIS. Alternatively, the server 110 may also return the location information and at least one of the image data, the video data, the audio data, or the speed information acquired by the information acquisition device 130 within the historical time period, which will be described in detail in the following operations.

In 1512, the MIS 120 may display a driving path of a vehicle within a historical time period on a map according to the acquired location information.

In some embodiments, the MIS 120 may display the driving path dynamically on the map according to an actual driving path generating speed of the driving path or a displaying ratio with respect to the actual driving path generating speed. For example, an icon representing the vehicle may dynamically move on the map and form a continuous driving path. In some embodiments, the processor 210 may divide the driving path into a plurality of segments. Different displaying properties (including brightness of the color, hue of the color, and/or thickness of the driving path) may be applied to at least two neighboring segments. A process of dividing the driving path into a plurality of segments and displaying the segments on the map will be described in detail below in conjunction with FIGS. 16 to 19.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 16:
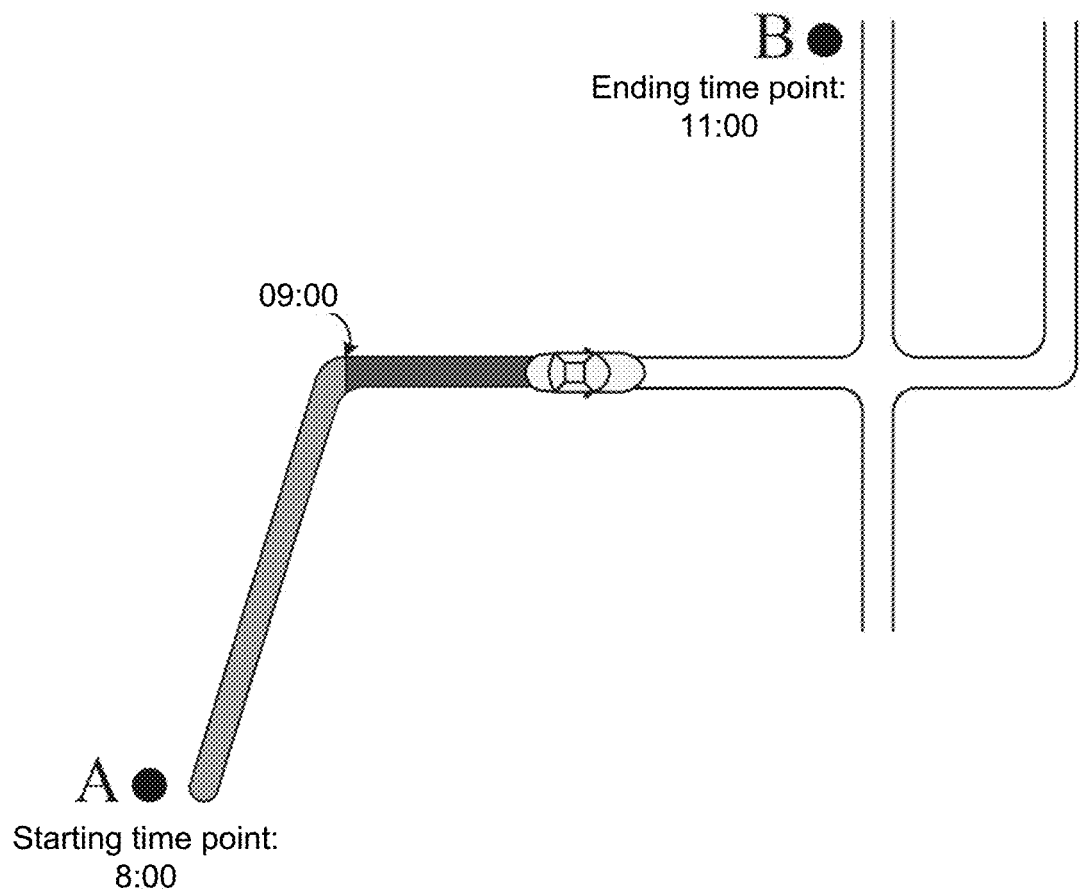
FIG. 16 is a schematic diagram illustrating exemplary segments divided based on a unit time according to some embodiments of the present disclosure.

FIG. 16 is a schematic diagram illustrating exemplary segments divided based on a unit time according to some embodiments of the present disclosure. In some embodiments, the processor 210 may divide the driving path into segments according to a unit time. For example, the administrator may need to view a driving path of a vehicle within a historical time period from 8:00 to 11:00, and the unit time may be set as one hour. As shown in FIG. 16, a driver may drive the vehicle from a location A to a location B within a historical time period from a starting time point (8:00) to an ending time point (11:00). The processor 210 may divide the driving path of the vehicle within the historical time period into three segments according to a distance travelled by the vehicle in each hour. A "gradually changing brightness" may be used for each segment to display a generating process of the driving path dynamically. As shown in FIG. 16, according to an actual driving path generating speed (e.g., an actual forming speed of each segment) or a displaying ratio with respect to the actual driving path generating speed, the route segments are separately displayed with different brightness so as to display the driving path of the vehicle from A to B dynamically.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 17:
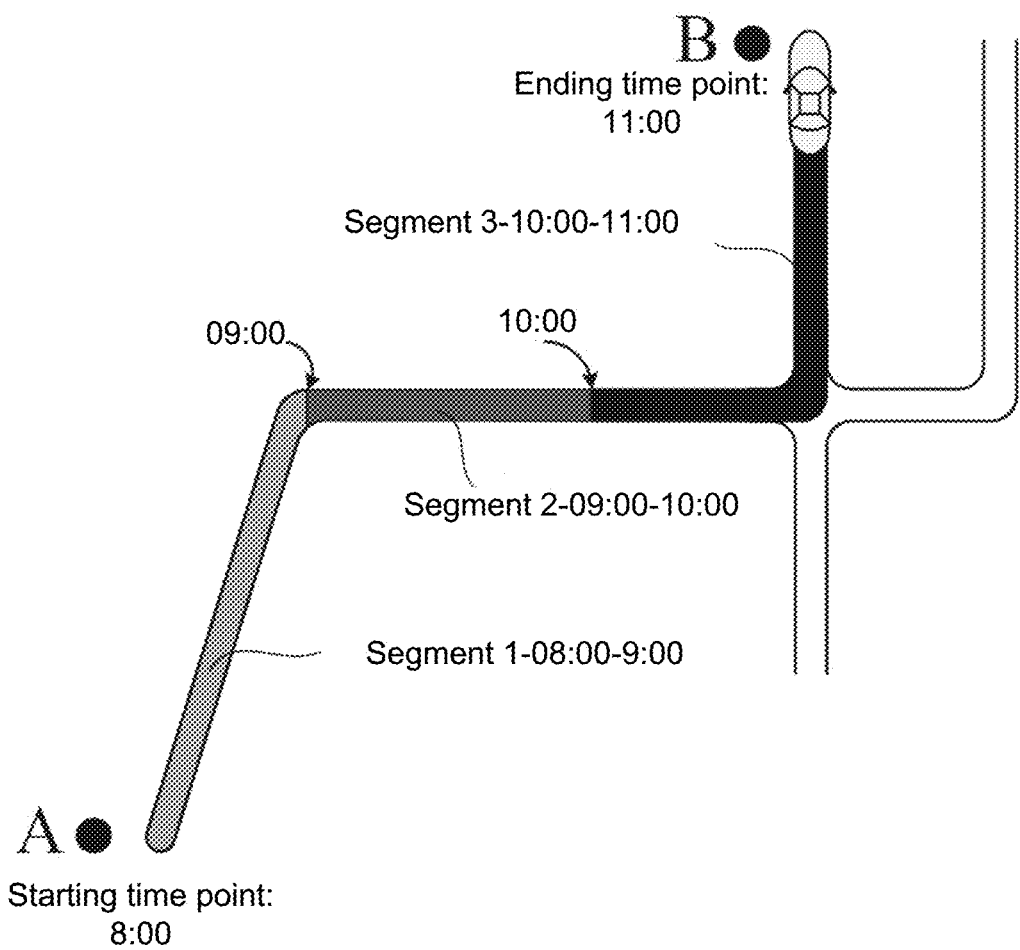
FIG. 17 is a schematic diagram illustrating exemplary segments divided based on a unit time according to some embodiments of the present disclosure.

FIG. 17 is a schematic diagram illustrating exemplary segments divided based on a unit time according to some embodiments of the present disclosure. For a vehicle starting from a location A and arriving at a location B, a driving path of the vehicle may be formed as shown in FIG. 17 from a starting time point (8:00) to an ending time point (11:00). The driving path of the vehicle may include Segment 1, Segment 2, and Segment 3. Segment 1 corresponds to the driving path of the vehicle from 8:00 to 9:00. Segment 2 corresponds to the driving path of the vehicle from 9:00 to 10:00. Segment 3 corresponds to the driving path of the vehicle from 10:00 to 11:00. The segments corresponding to different time periods (each unit time) can be effectively distinguished using the "gradually changing brightness". Thus it may be convenient for the administrator to view and/or manage different segments on a map via a terminal device. In some embodiments, other displaying properties may also be used to display each segment, such as the color hue (e.g., "gradually changing hue"), the thickness of the driving path, etc., which are not limited in the present disclosure.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 18:
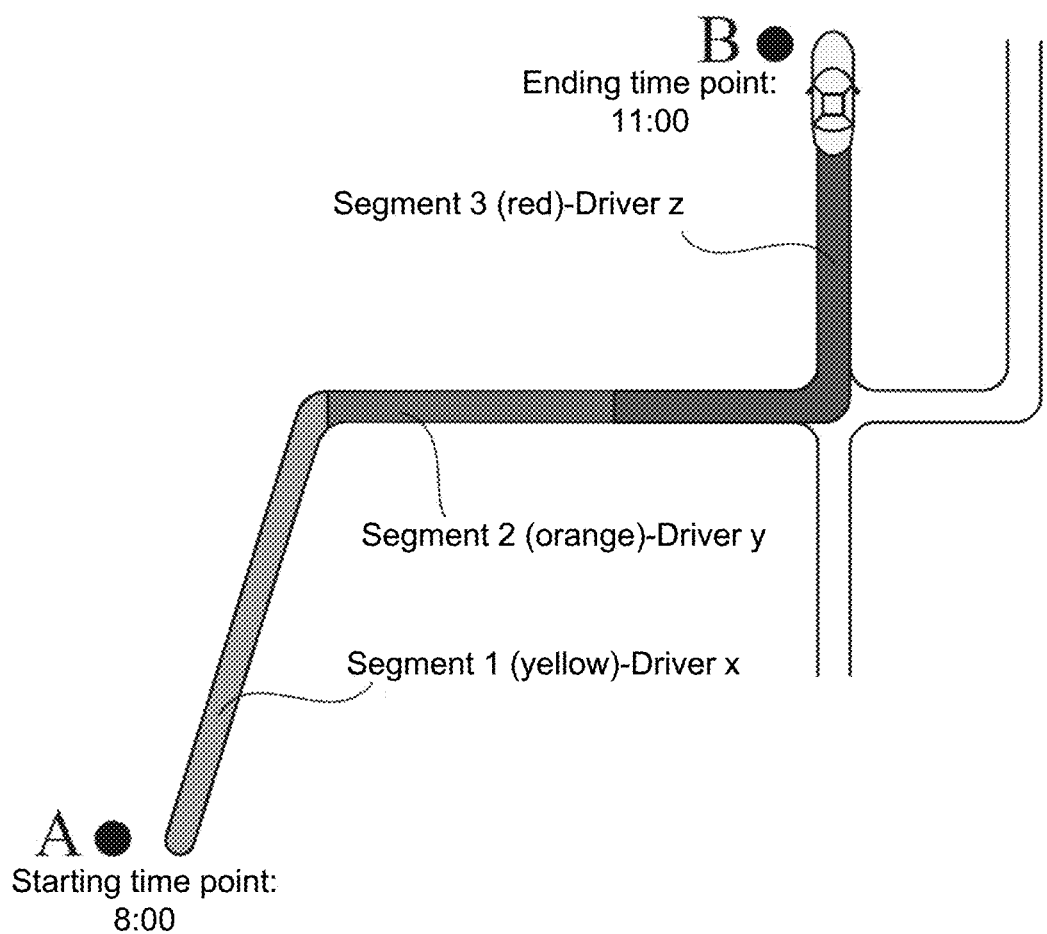
FIG. 18 is a schematic diagram illustrating exemplary segments divided based on drivers according to some embodiments of the present disclosure.

FIG. 18 is a schematic diagram illustrating exemplary segments divided based on drivers according to some embodiments of the present disclosure. In some embodiment, the processor 210 may divide the driving path into a plurality of segments according to the drivers. Merely by way of example, for a vehicle that starts from a location A and arrives at a location B, a driving path of a vehicle within a historical time period from 8:00 to 11:00 may be shown in FIG. 18. The driving path of the vehicle may include Segment 1, Segment 2, and Segment 3. A driver x drives the vehicle from 8:00 to 9:00 on Segment 1, a driver y drives the vehicle from 9:00 to 10:00 on Segment 2, and a driver z drives the vehicle from 10:00 to 11:00 on Segment 3. In some embodiments, a "gradually changing hue" displaying method may be used for each segment to dynamically display a generating process of the driving path. As shown in FIG. 18, in the driving path formed by a vehicle driving from the location A to the location B, Segment 1 on which a driver x drives the vehicle is displayed with a yellow color; Segment 2 on which a driver y drives the vehicle is displayed with an orange color; and Segment 3 on which a driver z drives the vehicle is displayed with a red color. The route segments corresponding to different drivers can be effectively distinguished through the "gradually changing hue" displaying method. Thus it may be convenient for the administrator to view and/or manage different segments on the map via a terminal device. It should be appreciated that the examples above are for illustration purpose, and the present disclosure is not intended to be limiting. As an example, other displaying properties may also be used to display each segment.

In some embodiments, in a process of dynamically displaying each segment (e.g., the process during which the vehicle travels from A to B), the displaying speed of each segment (actual driving path generating speed or a displaying ratio with respect to the actual driving path generating speed) may be associated with a distance that the vehicle passes through. For example, a generating process of a segment corresponding to a driver who travels a longer distance may be displayed with a higher displaying ratio (e.g., greater than 1) of an actual driving path generating speed. A generating process of a segment corresponding to a driver who travels a shorter distance may be displayed with a low displaying ratio (e.g., less than 1). In some embodiments, the displaying speed of each segment may be set to be associated with areas (e.g., urban area or rural area) that the vehicle passes through. For example, a generating process of a segment in an urban area may be displayed with a high displaying ratio, and a generating process of a segment in a suburban area may be displayed with a low displaying ratio. Alternatively, a generating process of a segment in an urban area may be displayed with a low displaying ratio, and a generating process of a segment in a suburban area may be displayed with a high displaying ratio.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 19:
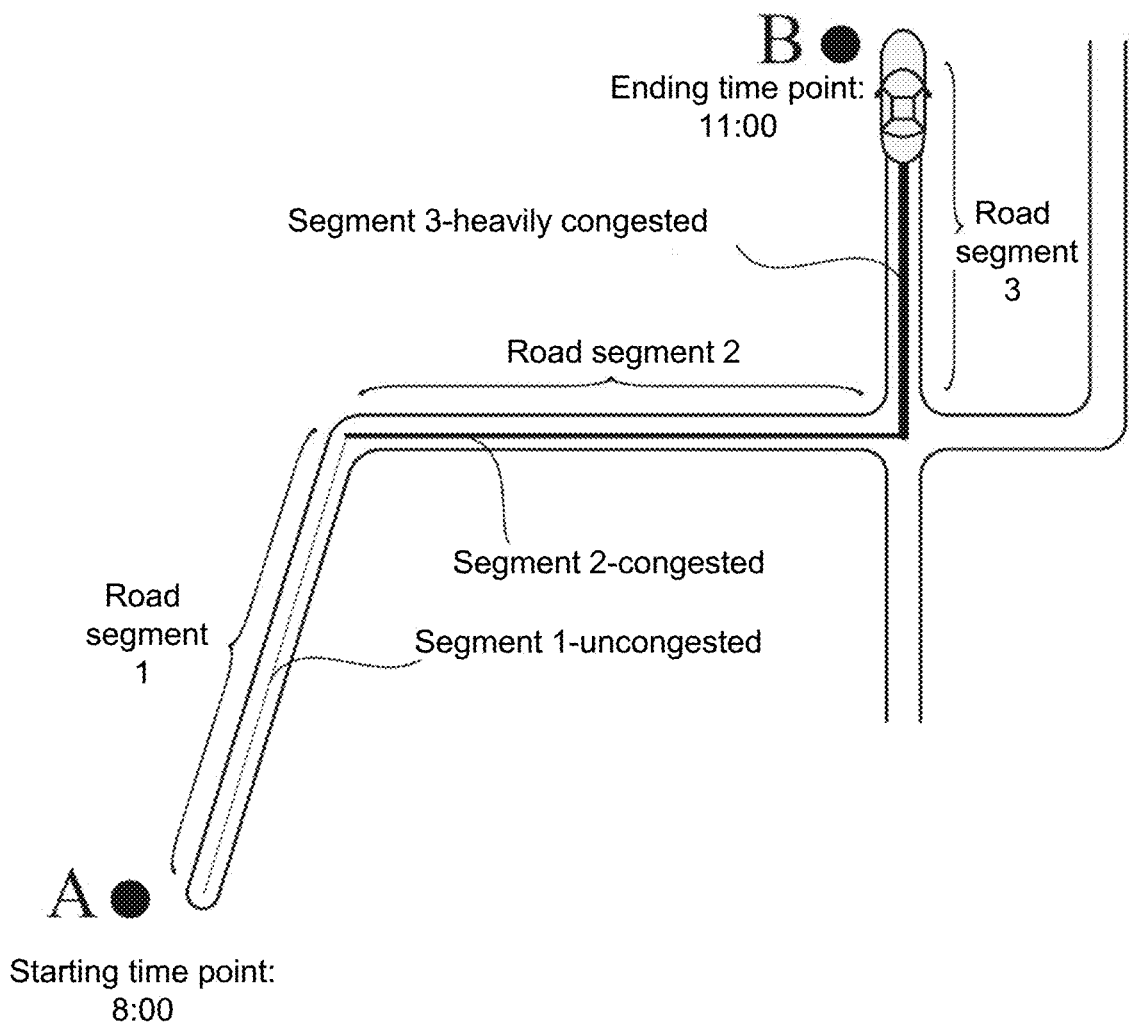
FIG. 19 is a schematic diagram illustrating exemplary segments divided based on traffic conditions according to some embodiments of the present disclosure.

FIG. 19 is a schematic diagram illustrating exemplary segments divided based on traffic conditions according to some embodiments of the present disclosure. In some embodiments, the processor 210 may divide the driving path into segments according to traffic conditions. For a vehicle that starts from a location A and arrives at a location B, a driving path of a vehicle within a historical time period from 8:00 to 11:00 may be shown in FIG. 19. The vehicle may have travelled three road segments including Road segments 1, Road segment 2, and Road segment 3 within the historical time period. Road segment 1 is uncongested, Road segment 2 is congested, and Road segment 3 is heavily congested. The driving path can be divided into 3 segments (i.e., Segment 1, Segment 2, and Segment 3) according to traffic conditions corresponding to Road segments 1 to 3. In some embodiments, the segments corresponding to the traffic conditions may be displayed on the map using lines having different thickness. As shown in FIG. 19, in a driving path formed by a vehicle that travels from the location A to the location B dynamically, a segment with an uncongested traffic condition is displayed with a thin line. The more congested the traffic condition is, the thicker the line for the route segment to be displayed is. The line thickness is used to display the congestion degree of a road segment, so that the segments corresponding to different traffic conditions can be effectively distinguished. Thus it may be convenient for the administrator to view and/or manage different segments on the map via a terminal device. It should be appreciated that the examples above are for illustration purpose, and the present disclosure is not intended to be limiting. As an example, other displaying properties may also be used to display each segment.

In a process for dynamically displaying each segment (e.g., the process in which the vehicle travels from the location A to the location B), the displaying speed of each segment may be an actual driving path generating speed or a displaying ratio with respect to the actual driving path generating speed. The displaying speed is not limited in the present application.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 20:
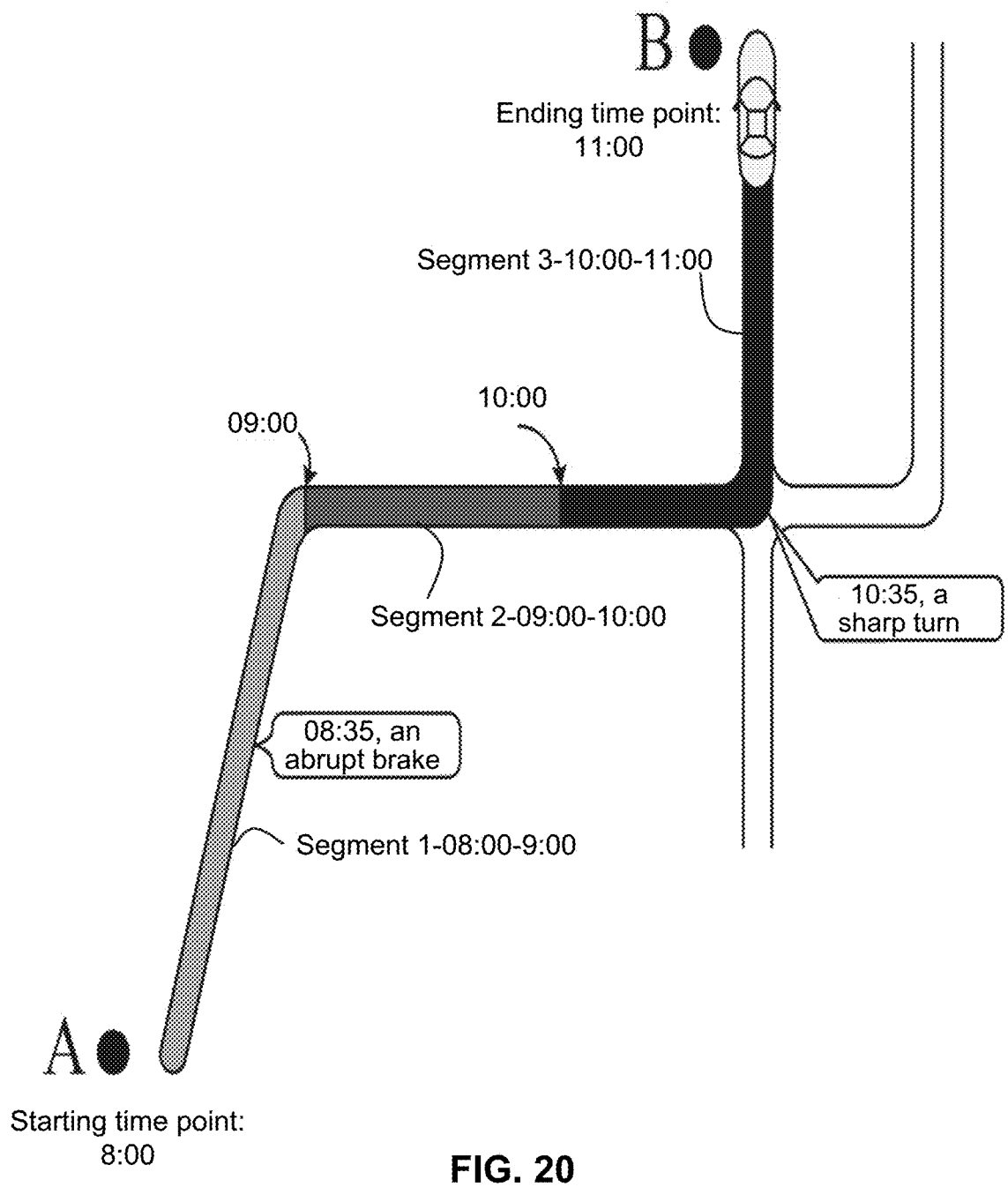
FIG. 20 is a schematic diagram illustrating exemplary segments and labelled abnormal events according to some embodiments of the present disclosure.

FIG. 20 is a schematic diagram illustrating exemplary segments with labelled abnormal events according to some embodiments of the present disclosure. In some embodiments, the processor 210 may determine whether abnormal events occurred in the process for driving the vehicle based on speed information acquired by the information acquisition device 130. For example, the abnormal events may include an abrupt brake, a sudden acceleration, a sharp turn, an overspeed behavior, or the like, or any combination thereof. The processor 210 may add certain labels to mark the abnormal events to locations on the driving path where the abnormal events occur. For example, as shown in FIG. 20, the vehicle had an abrupt brake at 8:35 (in Segment 1) and a sharp turn at 10:35 (in Segment 3) in the driving path. Labels "sharp brake" and "sharp turn" may be added at locations where the abnormal events occur. Thus, the driver, the passenger, or the administrator may view the abnormal events associated with the vehicle during the driving process more convenient. The operation may be simplified and the efficiency of managing the vehicle may be improved. In some embodiments, the information acquisition device 130 may upload the acquired speed information to the server 110. The MIS 120 may obtain the speed information from the server 110, and determine whether there is an abnormal event according to the speed information. In some embodiments, the information acquisition device 130 may determine whether there is an abnormal event after the speed information is acquired, and the determination result may be uploaded to the server 110. The MIS 120 may later obtain the determination result from the server 110. It should be noted that in the above process, the server 110 may return data associated with the abnormal events (the speed information or the determination result of the abnormal events) together with the location information to the MIS 120 when the MIS requests the location information from the server 110 (the server 110 may return the location information and data associated with the abnormal events to the MIS 120 at the same time). Alternatively, the MIS 120 may only request the data associated with the abnormal events from the server 110, causing the server 110 to return only the data associated with the abnormal events to the MIS 120.

To determine abnormal events during a driving process for a vehicle, the server 110, the MIS 120, or the information acquisition device 130 may set thresholds for different abnormal events, such as an abrupt brake, a sudden acceleration, a sharp turn, an overspeed behavior, or the like. As shown in Table 1 below, if the speed or the accelerated speed of the vehicle during the driving process exceeds a certain speed threshold or accelerated speed threshold, the processor 210 may determine that there is a corresponding abnormal event for the vehicle.

TABLE 1

| Abnormal Event | Threshold |
| --- | --- |
| Abrupt Brake | Accelerated Speed Threshold a |
| Sudden Acceleration | Accelerated Speed Threshold b |
| Sharp Turn | Angular Speed Threshold c |
| Over Speed | Speed Threshold d |

Referring back to FIG. 15, in 1514, the MIS 120 may obtain a selection operation of time points within the historical time period.

In 1516, the MIS 120 may display an image corresponding to the time point or playing a video or an audio starting from the time point.

In 1518, the MIS 120 may obtain a selection operation of a sub-period within the historical time period.

In 1520, the MIS 120 may play a video or an audio corresponding to the sub-period.

In some embodiments, the server 110 may return the scene related information together with the location information to the MIS 120 when the MIS requests the location information from the server 110 (the server 110 may return the location information and the scene related information to the MIS 120 at the same time). The scene related information may be determined based on data acquired by the information acquisition device 130, including image data, video data, video data, or the like, or any combination thereof. Alternatively, the MIS 120 may request the scene related information alone from the server 110, so as to cause the server 110 to return the scene related information to the MIS 120. The information exchange among the server 110, the MIS 120, and the information acquisition device 130 is not limited in the present disclosure. The combination of the driving path and the scene related information during the driving process of the vehicle (e.g., the images and/or sounds) may allow the administrator to obtain information relevant to the vehicle more quickly and more conveniently. Thus the efficiency for managing the vehicle may be improved.

The processor 210 may correct/verify the driving path based on the acquired image data, audio data, or video data. For example, the processor 210 may identify a target object in the image data or the video data so as to determine a geographic location information corresponding to the target object. In some embodiments, the geographic location information of the target subject may be determined using an image identification technology. The processor 210 may correct/verify the location information and/or a driving path of a vehicle according to the determined geographic location information. Thus the displaying accuracy of the driving path of the vehicle can be improved.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 21:
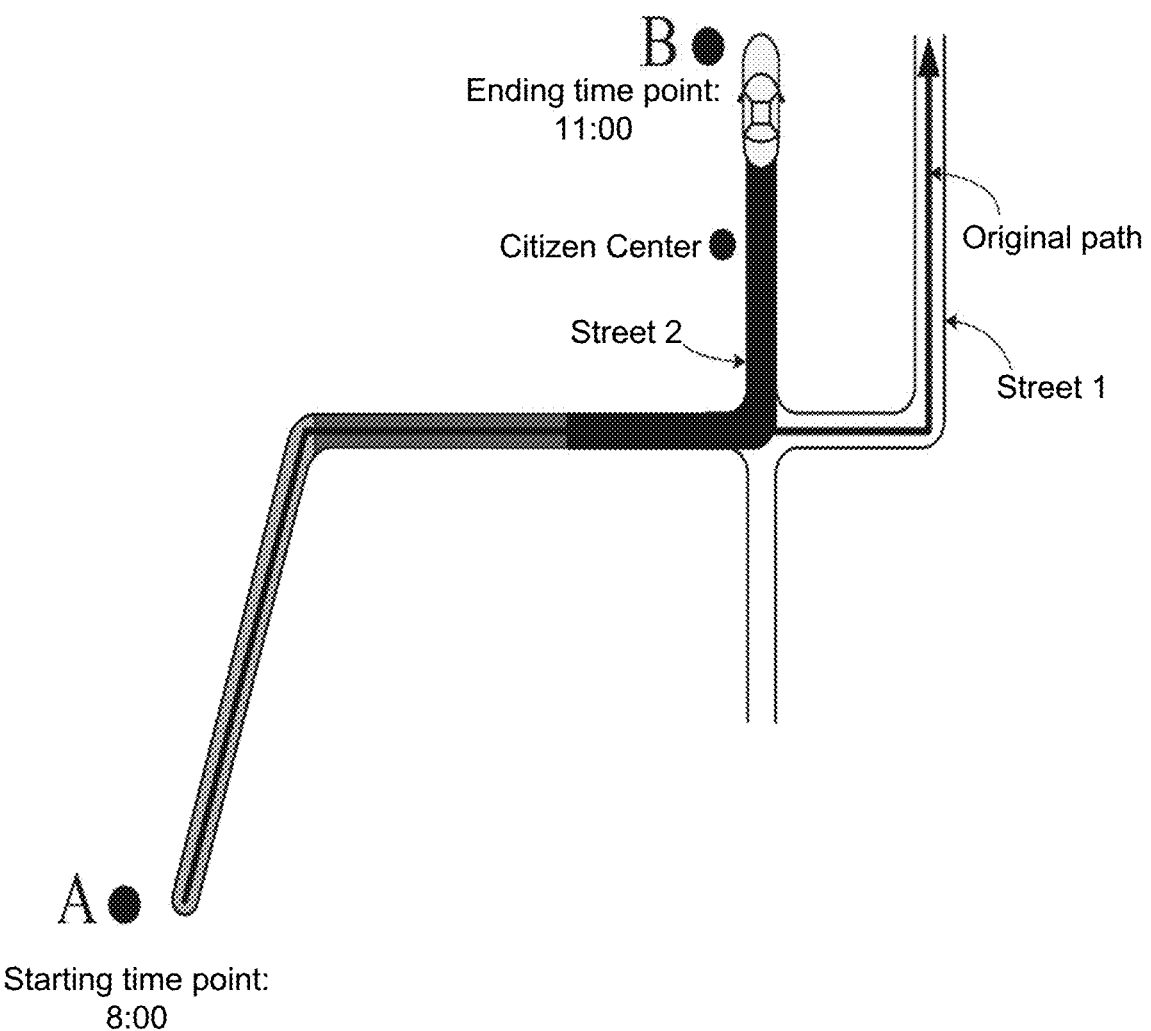
FIG. 21 is a schematic diagram illustrating an exemplary correction of a driving path of a vehicle according to some embodiments of the present disclosure.

FIG. 21 is a schematic diagram illustrating an exemplary correction of a driving path of a vehicle according to some embodiments of the present disclosure. As shown in FIG. 21, the MIS 120 may determine an "original path" according to the acquired location information. The original path may refer to a driving path determined based on the acquired location information of the vehicle. For example, in the original path, the vehicle may drive on Street 1. The MIS

120 may identify a "Citizen Center" in the acquired image data, audio data, and/or video data, and determine that the "Citizen Center" is located on one side of Street 2. Thus the MIS 120 may correct a part of the "original path" i.e., on Street 1 into a corrected route, i.e., on Street 2. Thus a correct driving path (e.g., a driving path in dark color from the location A to the location B of the vehicle in FIG. 21) may be obtained.

In some embodiments, a variety of modules of the information acquisition device 130 may acquire the location information, the image data, the video data, the audio data, the speed data, or the like, respectively. These modules may use a same clock (e.g., a network clock), or different clocks which are calibrated to have a same time for the electronic device and the information acquisition device 130 such that the location information, the image data, the video data, the audio data, and/or the speed data acquired by different devices are synchronized. Thus the MIS may display an image, or play a video or an audio corresponding to a selected time point or sub-period. The MIS may also correct the location information according to the image data or the video data.

According to the above embodiments of the present disclosure, the MIS 120 may obtain location information acquired within a historical time period by the information acquisition device 130 equipped in a vehicle. The MIS 120 may display the driving path of the vehicle in a form of a dynamically forming driving path, so that the administrator can quickly view a driving path of the vehicle within the historical time period. In some embodiments, the MIS 120 may display the driving path and the scene related information acquired during the driving process of the vehicle may, which may allow the administrator to obtain information relevant to the vehicle more quickly and more conveniently. The scene related information may include an image, a video, an audio, or the like, or a combination thereof. Thus the efficiency for managing the vehicle may be improved.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A method implemented on a computing device having at least one processor, at least one computer-readable storage medium, and a communication platform connected to a network for displaying a smooth movement of a vehicle on a map, the method comprising:
    obtaining a route of a vehicle via communicating with a service provider over a network;
    obtaining a last real-time location of the vehicle on the route and a last uploading time point corresponding to the last real-time location;
    obtaining driving data of one or more neighboring vehicles associated with the vehicle via communicating with the service provider over the network, wherein the driving data of the one or more neighboring vehicles associated with the vehicle includes durations of the one or more neighboring vehicles to traverse one or more parts of the route;
    determining a predicted location of the vehicle on the route at a prediction generating time point based on the last real-time location, the last uploading time point, and the driving data of one or more neighboring vehicles associated with the vehicle; and
    displaying a smooth movement of the vehicle from the last real-time location to the predicted location on a map implemented on a terminal device.

2. The method of claim 1, wherein the driving data of the one or more neighboring vehicles associated with the vehicle includes velocities of the one or more neighboring vehicles.

3. The method of claim 2, wherein determining the predicted location of the vehicle on the route at the prediction generating time point includes:
    determining a velocity of the vehicle based on velocities of the one or more neighboring vehicles associated with the vehicle;
    determining a predicted distance that the vehicle travels from the last uploading time point to the prediction generating time point based on the velocity; and
    determining the predicted location of the vehicle on the route at the prediction generating time point based on the predicted distance and the last real-time location.

4. The method of claim 1, wherein determining the predicted location of the vehicle on the route at the prediction generating time point includes:
    determining a predicted distance that the vehicle traverses from the last uploading time point to the prediction generating time point based on the durations of the one or more neighboring vehicles to traverse one or more parts of the route; and
    determining the predicted location of the vehicle on the route at the prediction generating time point based on the predicted distance and the last real-time location.

5. The method of claim 1, further including:
    determining a distance between the last real-time location and a station near the route;
    determining whether the distance is smaller than a threshold; and
    in response to the determination that the distance is smaller than the threshold,
        displaying the vehicle in a stationary status at a predicted location between the last real-time location and the station for a first duration on the map implemented on the terminal device.

6. The method of claim 1, further including:
    obtaining a current real-time location of the vehicle;
    determining whether the predicted location at the prediction generating time point is ahead of the current real-time location of the vehicle; and
    in response to the determination that the predicted location at the prediction generating time point is ahead of the current real-time location of the vehicle,
        displaying the vehicle in a stationary status at the predicted location on the map implemented on the terminal device until the current real-time location of the vehicle arrives at the predicted location.

7. A system for displaying a smooth movement of a vehicle on a map, comprising:
    at least one storage medium storing a set of instructions;
    at least one communication platform connected to a network; and
    at least one processor configured to communicate with the at least one storage medium or the at least one communication platform, wherein when executing the set of instructions, the at least one processor is directed to cause the system to:
        obtain a route of a vehicle via communicating with a service provider over a network;
        obtain a last real-time location of the vehicle on the route and a last uploading time point corresponding to the last real-time location;
        obtain driving data of one or more neighboring vehicles associated with the vehicle via communicating with the service provider over the network, wherein the driving data of the one or more neighboring vehicles associated with the vehicle includes durations of the one or more neighboring vehicles to traverse one or more parts of the route;
        determine a predicted location of the vehicle on the route at a prediction generating time point based on the last real-time location, the last uploading time point, and the driving data of one or more neighboring vehicles associated with the vehicle; and
        display a smooth movement of the vehicle from the last real-time location to the predicted location on a map implemented on a terminal device.

8. The system of claim 7, wherein the driving data of the one or more neighboring vehicles associated with the vehicle includes velocities of the one or more neighboring vehicles.

9. The system of claim 8, wherein to determine the predicted location of the vehicle on the route at the prediction generating time point, the at least one processor is further directed to cause the system to:
    determine a velocity of the vehicle based on velocities of the one or more neighboring vehicles associated with the vehicle;

determine a predicted distance that the vehicle travels from the last uploading time point to the prediction generating time point based on the velocity; and determine the predicted location of the vehicle on the route at the prediction generating time point based on the predicted distance and the last real-time location.

10. The system of claim 7, wherein to determine the predicted location of the vehicle on the route at the prediction generating time point, the at least one processor is further directed to cause the system to:

determine a predicted distance that the vehicle traverses from the last uploading time point to the prediction generating time point based on the durations of the one or more neighboring vehicles to traverse one or more parts of the route; and determine the predicted location of the vehicle on the route at the prediction generating time point based on the predicted distance and the last real-time location.

11. The system of claim 7, wherein the at least one processor is further directed to cause the system to:

determine a distance between the last real-time location and a station near the route;

determine whether the distance is smaller than a threshold; and in response to the determination that the distance is smaller than the threshold, display the vehicle in a stationary status at a predicted location between the last real-time location and the station for a first duration on the map implemented on the terminal device.

12. The system of claim 7, wherein the at least one processor is further directed to cause the system to:

obtain a current real-time location of the vehicle;

determine whether the predicted location at the prediction generating time point is ahead of the current real-time location of the vehicle; and in response to the determination that the predicted location at the prediction generating time point is ahead of the current real-time location of the vehicle, display the vehicle in a stationary status at the predicted location on the map implemented on the terminal device until the current real-time location of the vehicle arrives at the predicted location.

13. A non-transitory computer readable medium, comprising a set of instructions for displaying a smooth movement of a vehicle on a map, wherein when executed by at least one processor, the set of instructions directs the at least one processor to effectuate a method, the method comprising:

obtaining a route of a vehicle via communicating with a service provider over a network;

obtaining a last real-time location of the vehicle on the route and a last uploading time point corresponding to the last real-time location;

obtaining driving data of one or more neighboring vehicles associated with the vehicle via communicating with the service provider over the network, wherein the driving data of the one or more neighboring vehicles associated with the vehicle includes durations of the one or more neighboring vehicles to traverse one or more parts of the route;

determining a predicted location of the vehicle on the route at a prediction generating time point based on the last real-time location, the last uploading time point, and the driving data of one or more neighboring vehicles associated with the vehicle; and displaying a smooth movement of the vehicle from the last real-time location to the predicted location on a map implemented on a terminal device.

14. The non-transitory computer readable medium of claim 13, wherein the driving data of the one or more neighboring vehicles associated with the vehicle includes velocities of the one or more neighboring vehicles.

15. The non-transitory computer readable medium of claim 14, wherein determining the predicted location of the vehicle on the route at the prediction generating time point includes:

determining a velocity of the vehicle based on velocities of the one or more neighboring vehicles associated with the vehicle;

determining a predicted distance that the vehicle travels from the last uploading time point to the prediction generating time point based on the velocity; and determining the predicted location of the vehicle on the route at the prediction generating time point based on the predicted distance and the last real-time location.

16. The non-transitory computer readable medium of claim 13, wherein determining the predicted location of the vehicle on the route at the prediction generating time point includes:

determining a predicted distance that the vehicle traverses from the last uploading time point to the prediction generating time point based on the durations of the one or more neighboring vehicles to traverse one or more parts of the route; and determining the predicted location of the vehicle on the route at the prediction generating time point based on the predicted distance and the last real-time location.

17. The non-transitory computer readable medium of claim 13, the method further including:

determining a distance between the last real-time location and a station near the route;

determining whether the distance is smaller than a threshold; and in response to the determination that the distance is smaller than the threshold, displaying the vehicle in a stationary status at a predicted location between the last real-time location and the station for a first duration on the map implemented on the terminal device.

* * * * *